(12) United States Patent
Ling et al.

(10) Patent No.: US 11,983,365 B1
(45) Date of Patent: May 14, 2024

(54) METHODS AND SYSTEMS FOR DETERMINING STYLUS ORIENTATION INFORMATION

(71) Applicant: PARADE TECHNOLOGIES, LTD., San Jose, CA (US)

(72) Inventors: Yi Ling, Redwood City, CA (US); Pete Vavaroutsos, Scotts Valley, CA (US); Roel Coppoolse, San Jose, CA (US)

(73) Assignee: PARADE TECHNOLOGIES, LTD, San Jose, CA (US)

( * ) Notice: Subject to any disclaimer, the term of this patent is extended or adjusted under 35 U.S.C. 154(b) by 0 days.

(21) Appl. No.: 18/081,628

(22) Filed: Dec. 14, 2022

(51) Int. Cl.
| | | |
|---|---|---|
| *G06F 3/044* | (2006.01) | |
| *G02F 1/1333* | (2006.01) | |
| *G06F 3/0354* | (2013.01) | |
| *G06F 3/038* | (2013.01) | |
| *G06F 3/041* | (2006.01) | |
| *G06T 7/70* | (2017.01) | |

(52) U.S. Cl.
CPC ........ *G06F 3/0441* (2019.05); *G02F 1/13338* (2013.01); *G06F 3/03545* (2013.01); *G06F 3/038* (2013.01); *G06F 3/04162* (2019.05); *G06F 3/041661* (2019.05); *G06T 7/70* (2017.01); *G06F 3/0446* (2019.05); *G06F 2203/0384* (2013.01); *G06F 2203/04106* (2013.01); *G06F 2203/04108* (2013.01); *G06T 2207/20081* (2013.01)

(58) Field of Classification Search
CPC .................................................. G06F 3/0441
See application file for complete search history.

(56) References Cited

U.S. PATENT DOCUMENTS

| | | | | |
|---|---|---|---|---|
| 2002/0158866 A1* | 10/2002 | Batchko | ............... | H04N 13/388 |
| | | | | 345/419 |
| 2012/0284012 A1* | 11/2012 | Rodriguez | .............. | G06F 3/017 |
| | | | | 455/556.1 |
| 2017/0177098 A1* | 6/2017 | Chang | ................. | G06F 3/04883 |
| 2017/0344174 A1* | 11/2017 | Pant | .................. | G06F 3/041661 |
| 2018/0284946 A1* | 10/2018 | Yousefpor | ........... | G06F 3/03545 |
| 2020/0064940 A1* | 2/2020 | Chang | .................... | G06F 3/0442 |
| 2020/0064941 A1* | 2/2020 | Chang | ..................... | G06F 3/044 |
| 2020/0064942 A1* | 2/2020 | Chang | .................... | G06F 3/0383 |
| 2020/0064943 A1* | 2/2020 | Chang | ..................... | G06F 3/044 |
| 2023/0067179 A1* | 3/2023 | Kim | ........................ | H02J 50/12 |

(Continued)

*Primary Examiner* — Chun-Nan Lin
(74) *Attorney, Agent, or Firm* — Morgan, Lewis & Bockius LLP

(57) ABSTRACT

An electronic device includes a capacitive sense array and is coupled to a stylus including a conductive tip and a conductive wire module. The conductive tip and wire module of the stylus are driven by a tip drive signal and a wire drive signal simultaneously. The tip and wire drive signals have a single stylus drive frequency. While the conductive tip and wire module are driven by the tip and wire drive signals, the electronic device scans the capacitive sense array to obtain a plurality of capacitive sense signals from a plurality of sense electrodes of the capacitive sense array. The electronic device generates a composite image of the capacitive sense array based on the plurality of capacitive sense signals and processes the composite image to determine one or more orientation parameters (e.g., a tilt angle) of the stylus with respect to a surface of the capacitive sense array.

20 Claims, 10 Drawing Sheets

(56) References Cited

U.S. PATENT DOCUMENTS

2023/0125664 A1\* 4/2023 Itakura ............... G01C 19/5776
73/326
2023/0125764 A1\* 4/2023 Kim ..................... G06F 3/0383
345/173

\* cited by examiner

┌─ 900

At a processing device coupled to a capacitive sense array and a stylus, the capacitive sense array including a plurality of sense electrodes, the stylus including a conductive tip and a conductive ring: 902

> Cause a tip drive signal to drive the conductive tip and a wire drive signal to drive the conductive ring simultaneously. 904
>
>> Both the tip and wire drive signals have a single stylus drive frequency. 906
>
>> The conductive tip and conductive ring of the stylus are electrically coupled to each other, and the stylus further includes a transmitter coupled to the conductive tip and conductive ring of the stylus. The tip drive signal and wire drive signal are generated by the transmitter. 916

While the conductive tip and ring are driven simultaneously according to the tip and wire drive signals, scan the capacitive sense array to obtain a plurality of capacitive sense signals from the plurality of sense electrodes of the capacitive sense array. 908

Generate a first composite image of the capacitive sense array based on the plurality of capacitive sense signals. 910

Apply a machine learning model to process the first composite image to determine one or more orientation parameters of the stylus with respect to the surface of the capacitive sense array. 912

> The one or more first orientation parameters includes one or both of: a tilting angle $\varphi$ measured with respect to the surface of the capacitance sense array and a rotational angle $\theta$ measured with respect to a reference axis on the surface of the capacitance sense array. 914

Figure 9

METHODS AND SYSTEMS FOR DETERMINING STYLUS ORIENTATION INFORMATION

TECHNICAL FIELD

The disclosed embodiments relate generally to electronic circuits, including, but not limited to, methods, systems, and devices for exchanging signals between a touch detection device and a stylus to determine orientation information (e.g., the position, the tilt angle, and the rotational angle) of a stylus based on machine learning techniques.

BACKGROUND

Touch screens that utilize capacitive sense arrays are widely applied in today's industrial and consumer product markets. Capacitive sense arrays can be found in cellular phones, GPS devices, set-top boxes, cameras, computer screens, MP3 players, digital tablets, and the like, replacing mechanical buttons, knobs, and other conventional user interface controls. A capacitive sense array is often disposed below a touch sensing surface of a touch screen, and includes an array of capacitive sense elements. The capacitances of these capacitive sense elements vary when an object (e.g., a finger, a hand, a stylus, or another object) comes into contact with or hovers above the touch sensing surface. A processing device coupled to the capacitive sense array then measures the capacitances of the capacitive sense elements and/or identifies capacitance variations of the capacitive sense elements for determining a touch or presence of the object associated with the touch sensing surface. The use of the capacitive sense array has offered a convenient and reliable user interface solution that functions under many harsh conditions, so capacitive sense arrays made of capacitive sense elements have been widely used in many industrial and consumer products.

Capacitive sense arrays are applied with a stylus to detect position information of the stylus in real time, thereby allowing users to write directly onto a touch display of a computing device such as a smartphone, tablet computer, or laptop. Particularly, an active stylus has electronic components to enable communication with the computing device. The active stylus can implement a downlink operation in which the active stylus acts as a transmitter while the capacitive sense array acts as a receiver. The tilt angle (also referred to as the "tilting angle") of the stylus is detected based on the downlink operation. However, existing solutions for detecting the tilt angle of the stylus requires excessive signal synchronization, complex touch controller operations, and extended touch detection durations. It would be beneficial to have a simple, effective, and efficient mechanism to detect orientation information (particularly, tilt angle) of a stylus that is coupled to a touch sensing device.

SUMMARY

This application is directed to methods, systems, devices, and non-transitory computer-readable storage media for detecting orientation information (e.g., tilt angle) of a stylus by controlling the conductive tip and the conductive wire module of the stylus to transmit signals simultaneously and at the same frequency. The conductive tip of the stylus is driven by a tip drive signal, and the wire module of the stylus is driven by a wire drive signal that is synchronized with, and operates at the same frequency as, the tip drive signal. As the stylus is positioned in contact with or in proximity to a capacitive sense array, capacitive sense signals are scanned in the capacitive sense array and processed to monitor orientation information (e.g., the tilt angle) of the stylus. This arrangement of simultaneous tip and wire module driving avoids separate signal processing operations for the conductive tip and wire module of the stylus, and does not require additional signal synchronization and touch controller operations to control errors in orientation detection. Additionally, the same capacitive sense signals respond to both the tip and wire drive signals that operate simultaneously with the same frequency, and can be scanned within a substantially short touch scan time to offer a high data accuracy level.

Specifically, the tip and wire drive signals are generated to drive the conductive tip and wire module of the stylus in the same time slot and with the same frequency. After the capacitive sense array is scanned, the corresponding capacitive sense signals are measured and processed to provide a composite image (i.e., a single image frame including pixels that have varying values in response to both the tip and wire drive signals). In some situations, the conductive tip and wire module of the stylus are in close proximity to each other, and there is no clear boundary between pixels responding to the tip drive signal and pixels responding to the wire drive signal in the composite image. The tip position and the wire module position cannot be visually differentiated in the image, nor can the tilt angle be estimated directly based on geometric information (e.g., the tip position and the wire module position) determined from the tip and wire module positions. In some embodiments, machine learning techniques are implemented on a microcontroller (such as ARM's Cortex-M) to estimate tilt angle from the composite image (e.g., using a machine learning model). Machine learning can streamline a training or tuning process to automatically incorporate the impact from additional information (such as sensor sizes and response functions) without requiring manual programming or measurement.

It is noted that the conductive tip and wire drive signals operate to drive the conductive tip and wire module of the stylus simultaneously with the same frequency, thereby inducing the capacitive sense signals jointly and inseparably. The capacitive sense signals are scanned to monitor both the conductive tip and wire module within the same touch scan time based on the nature of time sharing between the tip and wire module transmissions. The touch scan time can be shortened to spare time to extend the display scan or increase the display refresh rate, thereby enhancing display qualities. Also, simultaneous couplings of the tip and wire drive signals to the capacitive sense array reduces or suppresses systemic errors that may result from asynchronous couplings of the tip and wire drive signals. Given that the conductive tip and wire module of the stylus are driven simultaneously with the same frequency, a touch controller and a processing device do not need to process multiple frequencies or time-multiplexed capacitive sense signals operations, and operations and designs of both the touch controller and processing device can be simplified (e.g., to have a reduced number of channels and to save corresponding die area).

In accordance with one aspect of the application, a method for detecting touch events on a touch sensing surface is performed at a processing device coupled to a capacitive sense array and a stylus. The capacitive sense array includes a plurality of sense electrodes. The stylus includes a conductive tip and a conductive wire module. The method includes causing a tip drive signal to drive the conductive tip and a wire drive signal to drive the conductive wire module simultaneously. Both the tip and wire drive signals have a single stylus drive frequency. The method further includes, while the conductive tip and wire module are driven simultaneously according to the tip and wire drive signals, scanning the capacitive sense array to obtain a plurality of capacitive sense signals from the plurality of sense electrodes of the capacitive sense array. The method further includes generating a first composite image of the capacitive sense array based on the plurality of capacitive sense signals and applying a machine learning model to process the first composite image to determine one or more first orientation parameters of the stylus with respect to a surface of the capacitive sense array. In some embodiments, the one or more first orientation parameters includes one or both of: a tilt angle φ measured with respect to the surface of the capacitance sense array and a rotational angle θ measured with respect to a reference axis on the surface of the capacitance sense array.

Thus, devices, storage media, and computing systems are provided with methods for detecting one or more orientation parameters of a stylus that touches a touch sensing surface, thereby increasing the effectiveness, efficiency, and user satisfaction with such systems. Such methods may complement or replace conventional methods for detecting orientation parameters of a stylus that touches or hovers above the touch sensing surface.

In another aspect, a processing device includes a processing core and memory. The processing device is coupled to a capacitive sense array and a stylus. The capacitive sense array includes a plurality of sense electrodes. The stylus includes a conductive tip and a conductive wire module. The memory stores one or more programs configured for execution by the processing core. The one or more programs includes instructions for causing a tip drive signal to drive the conductive tip and a wire drive signal to drive the conductive wire module simultaneously. Both the tip and wire drive signals have a single stylus drive frequency. The one or more programs further includes instructions for, while the conductive tip and wire module are driven simultaneously according to the tip and wire drive signals, scanning the capacitive sense array to obtain a plurality of capacitive sense signals from the plurality of sense electrodes of the capacitive sense array. The one or more programs further include instructions for generating a first composite image of the capacitive sense array based on the plurality of capacitive sense signals and applying a machine learning model to process the first composite image to determine one or more first orientation parameters of the stylus with respect to a surface of the capacitive sense array.

In yet another aspect, an electronic device includes a capacitive sense array including a plurality of sense electrodes, a stylus including a conductive tip and a conductive wire module, and a processing device coupled to the capacitive sense array and the stylus. The processing device is configured to cause a tip drive signal to drive the conductive tip and a wire drive signal to drive the conductive wire module simultaneously. Both the tip and wire drive signals have a single stylus drive frequency. The processing device is configured to perform, while the conductive tip and wire module are driven simultaneously according to the tip and wire drive signals, scanning the capacitive sense array to obtain a plurality of capacitive sense signals from the plurality of sense electrodes of the capacitive sense array. The processing device is configured to generate a first composite image of the capacitive sense array based on the plurality of capacitive sense signals and apply a machine learning model to process the first composite image to determine one or more first orientation parameters of the stylus with respect to a surface of the capacitive sense array.

Other embodiments and advantages may be apparent to those skilled in the art in light of the descriptions and drawings in this specification.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 9 is a flowchart for a method of monitoring stylus touch events, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
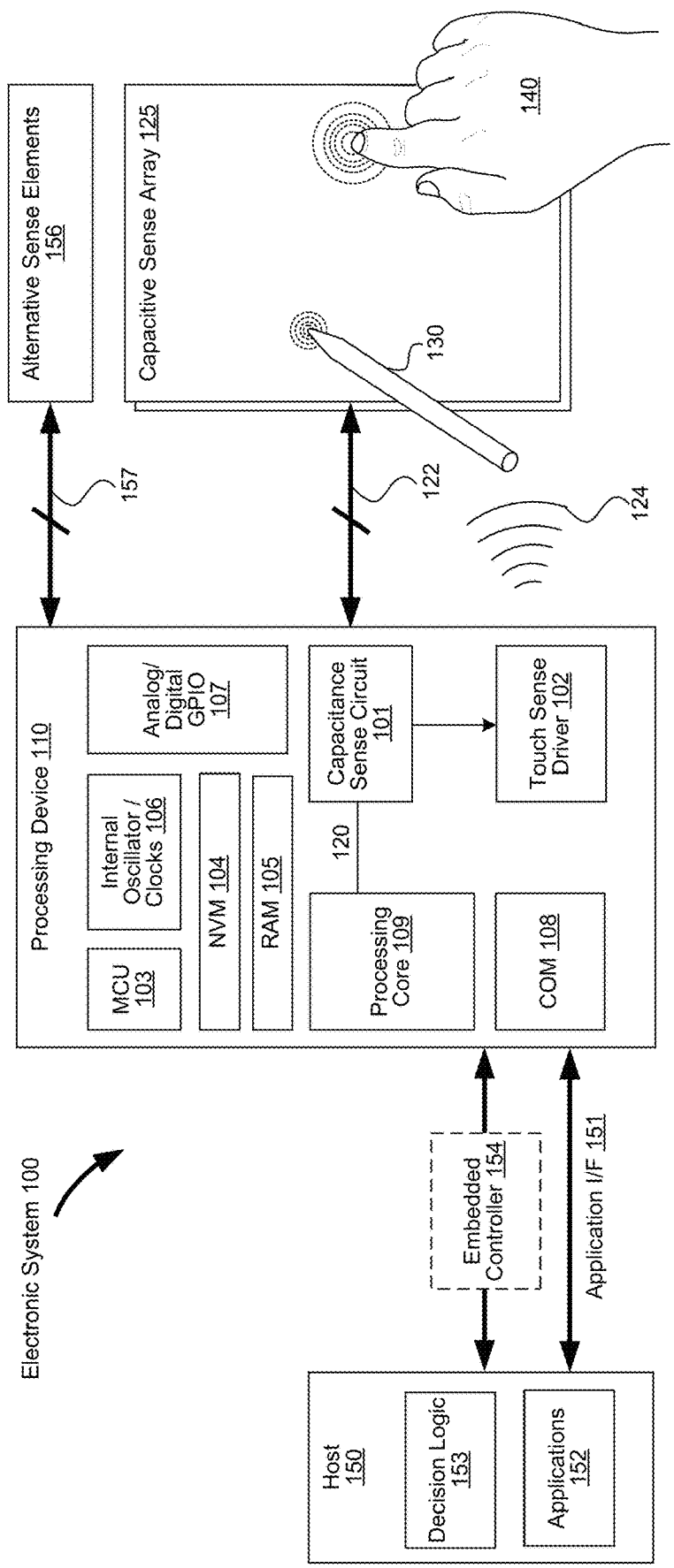
FIG. 1 is a block diagram illustrating an electronic system having a processing device that processes capacitive sense signals, in accordance with some embodiments.

FIG. 1 is a block diagram illustrating an electronic system 100 having a processing device 110, which processes capacitive sense signals, in accordance with some embodiments. The processing device 110 is configured to detect one or more touches proximate to a touch sensing device, such as capacitive sense array 125. The processing device 110 can detect conductive objects, such as touch objects 140 (a finger), a passive or active stylus 130, or any combination thereof. The capacitance sense circuit 101 measures touch data created by a touch using the capacitive sense array 125. The touch may be detected by a single or multiple sensing cells, each cell representing an isolated sense element or an intersection of sense elements (e.g., electrodes) of the capacitive sense array 125. In some embodiments, when the capacitance sense circuit 101 measures mutual capacitance of the touch sensing device (e.g., using the capacitive sense array 125), the processing device 110 acquires a two dimensional capacitive image of the touch sensing object and processes the capacitive image data for peaks and positional information. In some embodiments, the processing device 110 is coupled to a microcontroller (e.g., an external host device 150) that obtains a capacitance touch signal data set from the capacitive sense array 125. In some embodiments, touch detection firmware executing on the microcontroller identifies data set areas that indicate touches, detects and processes peaks, calculates the coordinates, or any combination thereof. The microcontroller can report the precise coordinates and other information to an application processor.

In some embodiments, the electronic system 100 includes a processing device 110, a capacitive sense array 125, a stylus 130, and a host 150. The capacitive sense array 125 may include capacitive sense elements that are electrodes made of conductive materials, such as copper. The sense elements may also be part of an indium-tin-oxide (ITO) panel (sometimes referred to a VCOM). The capacitive sense elements can be used to allow the capacitance sense circuit 101 to measure self-capacitance, mutual capacitance, or any combination thereof. In the depicted embodiment, the electronic system 100 includes the capacitive sense array 125 coupled to the processing device 110 via a bus 122, and the capacitive sense array 125 is configured to provide capacitive sense signals to the processing device via the bus 122. The capacitive sense array 125 may include a multi-dimension capacitive sense array. In some embodiments, the multi-dimension sense array includes multiple sense elements, organized as rows and columns. In some embodiments, the capacitive sense array 125 is a non-transparent capacitive sense array (e.g., PC touchpad). The capacitive sense array 125 may be disposed to have a flat surface profile. In some embodiments, the capacitive sense array 125 has a non-flat surface profile. In some embodiments, other configurations of capacitive sense arrays are be used. For example, instead of vertical columns and horizontal rows, the capacitive sense array 125 may have a hexagon arrangement, or the like, as would be appreciated by one of ordinary skill in the art having the benefit of this disclosure. In some embodiments, the capacitive sense array 125 is be included in an ITO panel or a touch screen panel. More details on the capacitive sense array 125 are explained below with reference to FIGS. 2, 3A, and 3B.

The operations and configurations of the processing device 110 and the capacitive sense array 125 for detecting and tracking a touch object 140 or a stylus 130 are described herein. In short, the processing device 110 is configurable to detect the presence of a touch object 140, the presence of a stylus 130 on the capacitive sense array 125, or any combination thereof. If the touch object is an active stylus, in some embodiments, the active stylus 130 is configured to operate as the timing "master," and the processing device 110 adjusts the timing of the capacitive sense array 125 to match that of the active stylus 130. In some embodiments, the capacitive sense array 125 is capacitively coupled with the active stylus 130, as opposed to conventional inductive stylus applications. It should also be noted that the same assembly (e.g., the processing device 110) used for the capacitive sense array 125, which is configured to detect touch objects 140, is also used to detect and track a stylus 130 without an additional PCB layer for inductively tracking the active stylus 130.

In some embodiments, the stylus 130 is communicatively coupled to the processing device 110 (specifically, to a communication module 108) via a wireless communication link 124 (e.g., a Bluetooth link). The processing device 110 provides timing and communication parameters to the stylus 130 in an uplink transmission via the wireless communication link 124. The stylus 130 recovers transmission parameters from the timing and communication parameters, and generates drive signals to drive the conductive tip and the conductive wire module. In an example, the transmission parameters include one or more of: the amplitude, the delay, the transmission frequency, and the number of transmission pulses for a respective drive signal driving a conductive tip or a wire module of the stylus 130. The respective drive signal is therefore defined for each of the conductive tip and wire module of the stylus 130 according to the corresponding transmission parameters.

In some embodiments, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). In some embodiments, the digital block array is configured to implement a variety of digital logic circuits (e.g., DACs, digital filters, and/or digital control systems) using configurable user modules ("UMs"). The digital block array may be coupled to a system bus. The processing device 110 may also include memory, such as random access memory ("RAM") 105 and non-volatile memory ("NVM") 104. The RAM 105 may be static RAM ("SRAM"). The non-volatile memory 104 may be flash memory, which may be used to store firmware (e.g., control algorithms executable by the processing core 109 to implement operations described herein). The processing device 110 may also include a memory controller unit ("MCU") 103 coupled to memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. In the case of the memory being internal, the memory may be coupled to a processing element, such as the processing core 109. In the case of the memory being external to the processing device 110, the processing device 110 is coupled to the other device in which the memory resides as would be appreciated by one of ordinary skill in the art having the benefit of this disclosure.

Some or all of the operations of the processing core 109 may be implemented in firmware, hardware, software, or some combination thereof. The processing core 109 may receive signals from the capacitance sense circuit 101, determine the state of the capacitive sense array 125 (e.g., determining whether an object is detected on or in proximity to the touch sensing surface), resolve where the object is on the capacitive sense array (e.g., determining the location of the object), track the motion of the object or the stylus, or generate other information related to an object detected at the capacitive sense array 125. In some embodiments, the processing device 110 further includes a touch sense driver 102 coupled to the capacitance sense circuit 101. The touch sense driver 102 functions in conjunction with the processing core 109, and is configured to implement part or all of the above touch detection functions of the processing core 109. In some embodiments, the processing core 109 includes a capacitance sense circuit 101. In some embodiments, the processing core 109 performs some or all the functions of capacitance sense circuit 101. Likewise, the touch sense driver 102 may include part or all of the capacitance sense circuit 101, and perform some or all the functions of capacitance sense circuit 101.

In some embodiments, the processing core 109 generates a multi-touch enable signal 120, which that controls the capacitance sensing circuit 101 to detect touch locations. The multi-touch enable signal 120 is used to enable a touch sensing state. In the touch sensing state, self or mutual capacitance of sense electrodes of the capacitive sense array 125 is scanned in capacitive sense scans. One or more touch locations are thereby detected if one or more objects touch the touch sensing surface of the electronic system 100.

The processing device 110 may also include an analog block array (not shown) (e.g., field-programmable analog array). The analog block array is also coupled to the system bus. An analog block array may be configured to implement a variety of analog circuits (e.g., ADCs or analog filters) using, in some embodiments, configurable UMs. The analog block array may also be coupled to the GPIO 107.

In some embodiments, the capacitance sense circuit 101 is integrated into the processing device 110. The capacitance sense circuit 101 includes analog I/O for coupling to an external component, such as a touch-sensor pad (not shown), a capacitive sense array 125, a touch-sensor slider (not shown), a touch-sensor buttons (not shown), and/or other devices. The capacitance sense circuit 101 may be configured to measure capacitance using mutual-capacitance sensing techniques, self-capacitance sensing technique, charge-coupling techniques, charge balancing techniques, or the like. In some embodiments, the capacitance sense circuit 101 operates using a charge accumulation circuit, a capacitance modulation circuit, or other capacitance sensing methods known by those skilled in the art. In some embodiments, other capacitance sensing circuits may be used. The mutual capacitive sense arrays, or touch screens, as described herein, may include a transparent, conductive sense array disposed on, in, or under either a visual display itself (e.g. LCD monitor), or a transparent substrate in front of the display.

The capacitive sense array 125 includes a plurality of sense electrodes. When a touch object, such as a finger or stylus, approaches the capacitive sense array 125, the object causes a decrease in mutual capacitance between some of the sense electrodes. In some embodiments, the presence of a finger increases the capacitance of the electrodes to the environment (Earth) ground, typically referred to as self-capacitance change. In some embodiments, the sense electrodes of the capacitive sense array 125 are configured to operate as transmit (TX) electrodes and receive (RX) electrodes of a mutual capacitive sense array in a first mode to detect touch objects, and to operate as electrodes of a coupled-charge receiver in a second mode to detect a stylus 130 on the same electrodes of the capacitive sense array 125.

In the first mode, a mutual capacitance is measured at an intersection of an RX electrode and a TX electrode when a transmit signal provided at the RX electrode is coupled to the TX electrode. Utilizing the change in mutual capacitance, the location of the finger on the capacitive sense array 125 is determined by identifying an RX electrode having a decreased coupling capacitance with a TX electrode whose signal was applied at the time the decreased capacitance is measured on the RX electrode. Therefore, the locations of one or more touch objects can be determined by sequentially scanning the capacitances associated with the intersections of electrodes. In some embodiments, in the second mode, the stylus 130 is activated to generate one or more drive signals (e.g., a tip drive signal 222 and a wire drive signal 224 in FIG. 2), which are then coupled to at least a subset of sense electrodes of the capacitive sense array 125 located below the stylus 130.

In some embodiments, the processing device 110 calibrates the sense elements (intersections of RX and TX electrodes) by determining baselines for the sense elements. In some embodiments, interpolation is used to detect finger position at higher resolution than the spatial pitch of the sense electrodes of the capacitive sense array 125, and various types of coordinate interpolation algorithms are optionally used to detect the center location of a touch.

The processing device 110 may include internal oscillator/clocks 106 and a communication block ("COM") 108. In some embodiments, the processing device 110 includes a spread-spectrum clock (not shown). The oscillator/clocks 106 provides clock signals to one or more of the components of processing device 110. The communication block 108 may be used to communicate with an external component, such as an application processor 150, via an application interface ("I/F") line 151. In some embodiments, the processing device 110 may also be coupled to an embedded controller 154 to communicate with the external components, such as a host 150. In some embodiments, the processing device 110 is configured to communicate with the embedded controller 154 or the host 150 to send and/or receive data.

The processing device 110 may reside on a common carrier substrate such as, for example, an integrated circuit ("IC") die substrate, a multi-chip module substrate, or the like. In some embodiments, the components of the processing device 110 are one or more separate integrated circuits and/or discrete components. In some embodiments, the processing device 110 includes one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is noted that the embodiments described herein are not limited to having a configuration of a processing device coupled to an application processor. Some embodiments include a system that measures the capacitance on the sensing device and sends the raw data to a host computer 150 where it is analyzed by an application. In effect, the processing that is done by the processing device 110 may also be done in the application processor. Specifically, in some embodiments, instead of performing the operations of the processing core 109 in the processing device 110, the processing device 110 sends the raw data or partially-processed data to the host 150. The host 150, as illustrated in FIG. 1, may include decision logic 153 that performs some or all of the operations of the processing core 109. Operations of the decision logic 153 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing core 109 may be implemented in the decision logic 153, the applications 152, or in other hardware, software, and/or firmware external to the processing device 110. In some other embodiments, the processing device 110 is the host 150.

The capacitance sense circuit 101 may be integrated into the IC of the processing device 110, or in a separate IC. In some embodiments, descriptions of capacitance sense circuit 101 are generated and compiled for incorporation into other integrated circuits. For example, behavioral level code describing the capacitance sense circuit 101, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the capacitance sense circuit 101.

It is noted that the components of the electronic system 100 may include all the components described above. In some embodiments, the electronic system 100 includes fewer than all of the components described above.

In some embodiments, the electronic system 100 is used in a tablet computer. In some embodiments, the electronic device is used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The embodiments described herein are not limited to touch screens or touch-sensor pads for notebook embodiments. Embodiments can be used in other capacitive sensing devices, such as a touch-sensor slider (not shown) or touch-sensor buttons (e.g., capacitance sensing buttons). In some embodiments, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these capacitive sensing embodiments may be used in conjunction with non-capacitive sensing elements, including but not limited to pick buttons, sliders (e.g., display brightness and contrast), scroll-wheels, multi-media control (e.g., volume and track advance), handwriting recognition, and numeric keypad operation.

In some embodiments, the electronic system 100 further includes one or more alternative sense elements 156 configured to communicate with the processing device 110 via a bus 157. Each alternative sense element 156 is optionally a capacitance based sensor or a non-capacitance sensor. Example alternative sense elements 156 include, but are not limited to, an ambient light sensor, a capacitive touch button, and a side touch sensor.

Figure 2:
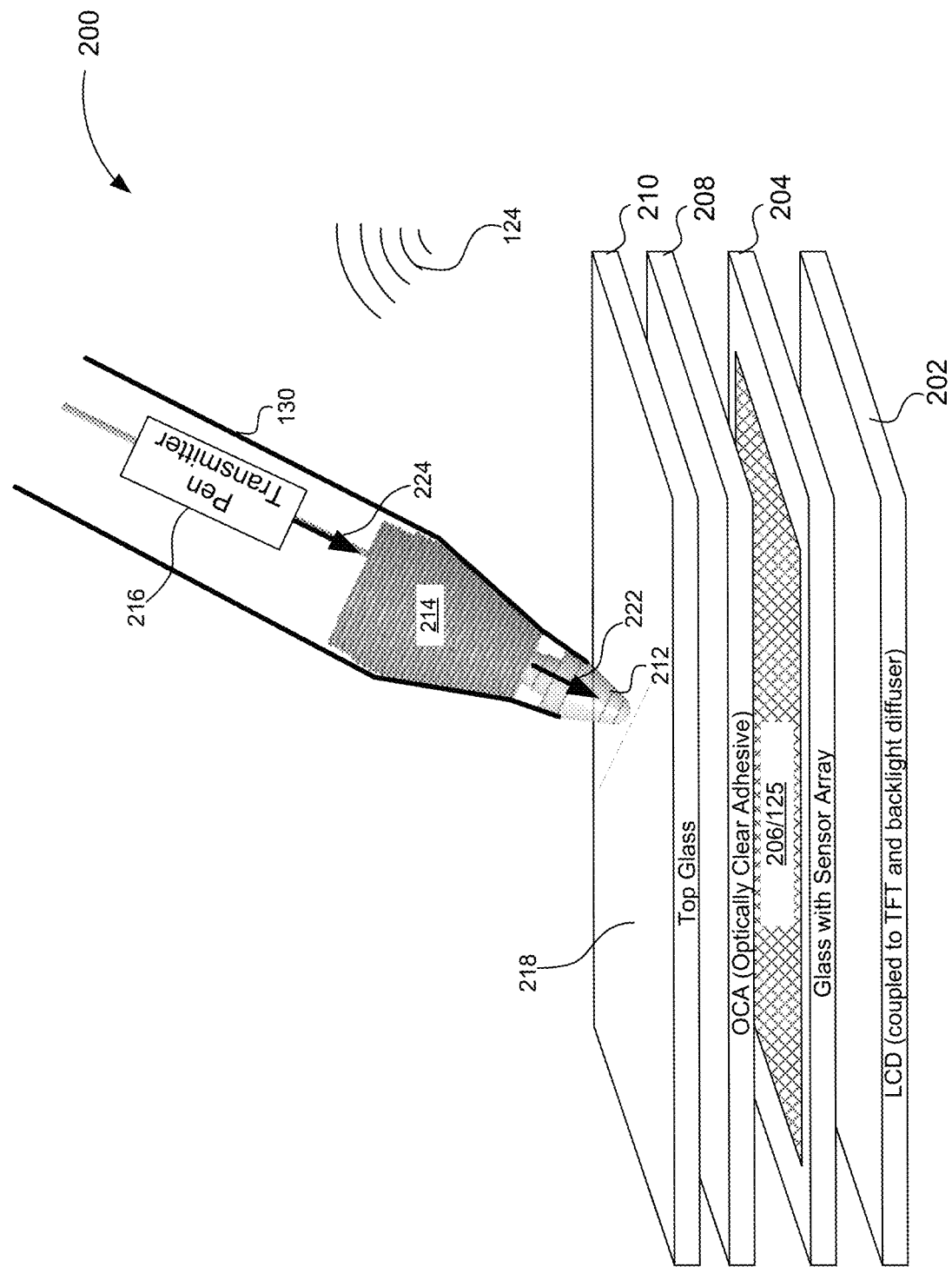
FIG. 2 illustrates an example touch screen assembly that includes a capacitive sense array 125, in accordance with some embodiments.

FIG. 2 illustrates an example touch screen assembly 200 that includes a capacitive sense array 125, in accordance with some embodiments. The touch screen assembly 200 includes a liquid crystal display (LCD) 202 overlaid by the glass 204. A sensor pattern 206 is constructed on the surface of the glass 204 to form the capacitive sense array 125. Optionally, as shown in FIG. 2, the sensor pattern 206 is constructed on a top surface of the glass 204 that faces away from the LCD 202. Optionally, the sensor pattern 206 is constructed on the bottom surface of the glass 204, which faces the LCD 202. Optically clear adhesive (OCA) 208 is used to bond the top glass 210 to the surface of the glass 204 on which the sensor pattern 206 is constructed, thus protecting the sensor pattern 206.

Figure 3B:
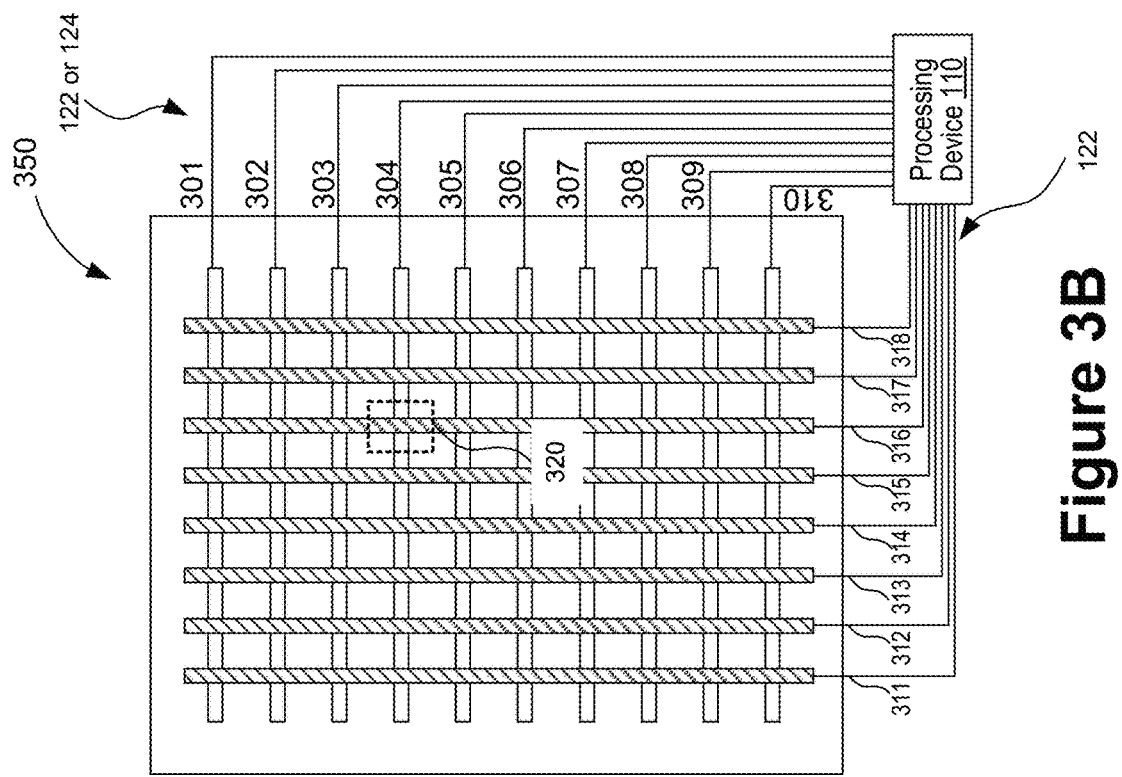
FIG. 3B illustrates an example orthogonal electrode matrix used to form a capacitive sense array in accordance with some embodiments.

Optionally, the sensor pattern 206 is a diamond pattern (FIG. 3A) or a row-column pattern (FIG. 3B). The capacitive sense array 125 formed from the sensor pattern 206 includes row and column sense electrodes, which can be expressed as a matrix of the intersections between row and column electrodes. In some embodiments, the row and column sense electrodes are formed on two conductive layers that are electrically insulated from each other, and both of the conductive layers are formed on the top or bottom surface of the glass 204. The resolution of the capacitive sense array 125 is represented as the product of the number of columns and the number of rows. For example, when a capacitive sense array 125 has N row electrodes and M column electrodes, the number of intersections is N×M, and the resolution of the capacitive sense array 125 is N×M as well.

Additionally, the raw resolution of the capacitive sense array 125 is determined based on the sensor size, and the post-processing resolution of the capacitive sense array 125 is finer than the sensor size. In an example, the sensor size is 4.5 mm×4.5 mm. The raw resolution of the capacitive sense array 125 is determined based on the sensor size, and the post-processing resolution can be less than $\frac{1}{16}$ mm.

The LCD 202 is electrically coupled to a thin film transistor (TFT) array and a backlight diffuser that are disposed below the LCD 202. The TFT array is configured to drive the LCD 202 electrically, and the backlight diffuser is configured to provide substantially uniform illumination to the LCD 202. The touch sensing portion is above the LCD layer and forms the capacitive sense array 125. In some embodiments, each electrode layer can be used independently to measure the self-capacitance between the electrode and (Earth or system) ground to form a capacitive sense array 125. The touch electrodes can be in the same layer or on separate layers. In some embodiments, the Pixel electrodes in the LCD layer 202 are used as electrodes for capacitive measurement to (Earth or system) ground and form a capacitive sense array 125. In some embodiments, the conductive routing to circuitry operating the LCD is used as electrodes for capacitive measurement to (Earth or system) ground and form a capacitive sense array 125.

In some embodiments, the touch screen assembly 200 is coupled to a stylus 130 via a wireless communication link 124. The stylus 130 receives timing and communication parameters provided to the stylus 130 in an uplink transmission via the wireless communication link 124, and recovers transmission parameters (e.g., the transmission frequency and the number of pulses of the drive signal) from the timing and communication parameters. The stylus 130 includes a conductive tip 212 and a conductive wire module 214. In some embodiments, the conductive wire module 214 includes a single turn of a conductive wire. Alternatively, in some embodiments, the conductive wire module 214 includes a plurality of turns of conductive wire. In some embodiments, the cross section of the conductive wire module 214 has a circular shape. Alternatively, in some embodiments, the cross section of the conductive wire module 214 is a square, a rectangle, a triangle, a pentagon, a hexagon, or another irregular or regular shape. In some embodiments, the conductive tip 212 and conductive wire module 214 of the stylus 130 are electrically coupled to each other, and the stylus 130 further includes a transmitter circuit 216 coupled to the conductive tip 212 and conductive wire module 214 of the stylus 130. The transmitter circuit 216 generates a tip drive signal 222 and a wire drive signal 224 to drive the conductive tip 212 and the conductive wire module 214 based on the corresponding transmission parameters, respectively.

In some embodiments, the conductive tip 212 and conductive wire module 214 of the stylus 130 are coupled in series with each other, and each of the tip drive signal 222 and wire drive signal 224 includes a bias current provided by the transmitter circuit 216. Alternatively, in some embodiments, the conductive tip 212 and the conductive wire module 214 of the stylus 130 are coupled in parallel with each other, and each of the tip drive signal 222 and wire drive signal 224 includes a bias voltage provided by the transmitter circuit 216.

Under some circumstances, the stylus 130 is positioned in proximity to or in contact with the touch sensing surface 218 of the capacitive sense array 125. The conductive tip 212 and the wire module 214 transmit the tip drive signal 222 and wire drive signal 224, resulting in variations to the electric field of a subset of capacitive sense electrodes in the capacitive sense array 125. Stated another way, the conductive tip 212 and wire module 214 operate as transmit (TX) electrodes, and the subset of capacitive sense electrodes of the capacitive sense array 125 function as receive (RX) electrodes of a coupled-charge receiver in a second mode (i.e., a stylus touch mode). In the second mode, capacitive sense signals are measured from at least a subset of capacitive sense electrodes in the capacitive sense array 125 that are coupled to the conductive tip 212 and wire module 214 of the conductive tip.

In some embodiments, the capacitance sense circuit 101 scans the capacitive sense signals from the touch sensing device (e.g., using the capacitive sense array 125). The processing device 110 acquires a two dimensional (2D) capacitive image (e.g., a composite image 406 in FIG. 4) of the stylus 130 and processes the 2D capacitive image data for signal peaks and positional information. Further, in some embodiments, the 2D capacitive image is a combination of the capacitive sense signals collected from all of the capacitive sense electrodes of the capacitive sense array 125. Alternatively, in some embodiments, the 2D capacitive image is a subset of the capacitive sense signals. The subset of the capacitive sense signals corresponds to a subset of capacitive sense electrodes that are in proximity to or in contact with the stylus 130 and less than all of the capacitive sense electrodes of the capacitive sense array 125.

Figure 3A:
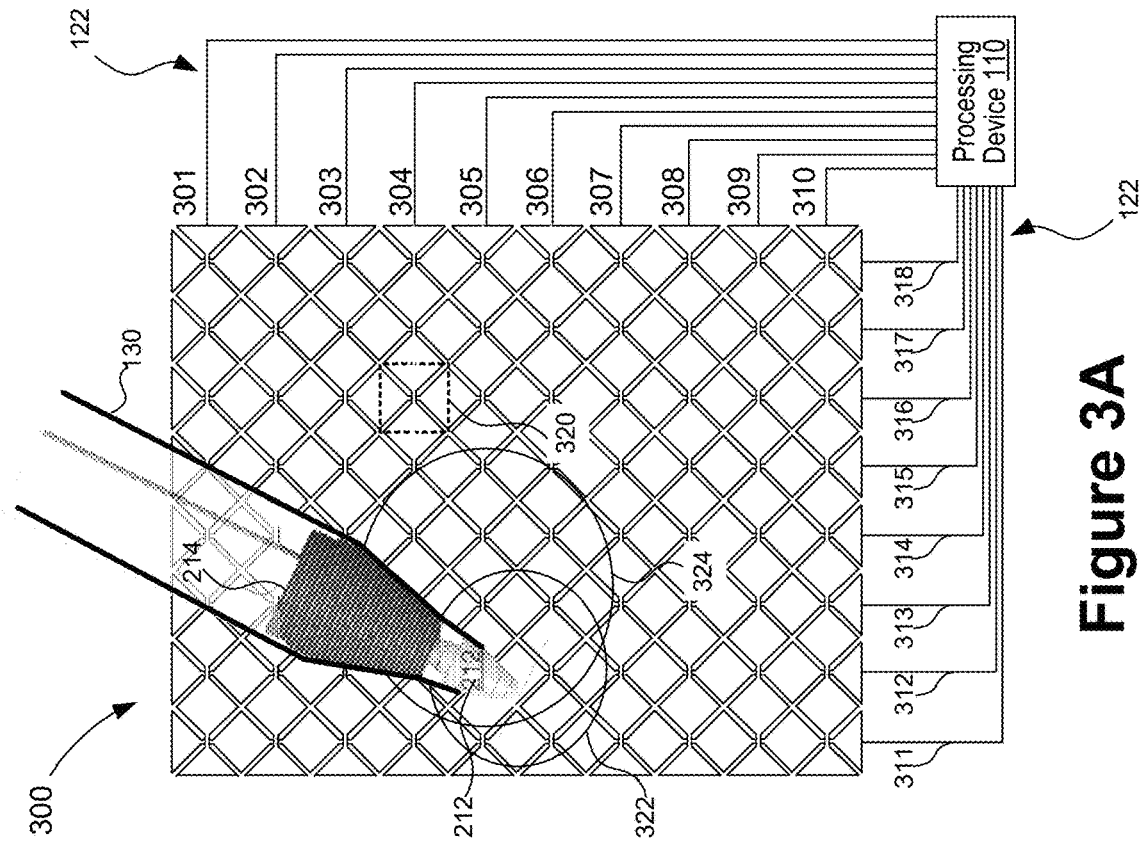
FIG. 3A illustrates a solid diamond pattern used to form a capacitive sense array in accordance with some embodiments.

FIG. 3A illustrates a solid diamond pattern 300 used to form a capacitive sense array 125 in accordance with some embodiments. FIG. 3B illustrates an example orthogonal electrode matrix 350 used to form a capacitive sense array 125 in accordance with some embodiments. When the solid diamond pattern 300 or the orthogonal electrode matrix 350 is applied in a capacitive sense array 125, the capacitive sense array 125 includes a plurality of row sense electrodes 301-310 and a plurality of column sense electrodes 311-318. The row and column sense electrodes 301-318 are connected to a processing device 110 (which may include the functionality of a capacitance sensing circuit 101) by the bus 122, and configured to provide capacitive sense signals to the processing device 110. In some embodiments, the processing device 110 may perform TX-RX scans of the capacitive sense array 125 to measure the mutual capacitance value associated with each of the intersections between a row sense electrode and a column sense electrode in the capacitive sense array 125. The measured mutual capacitances are further processed at the processing device or at a host 150 to determine higher resolution locations of one or more contacts on the capacitive sense array 125.

Referring to FIG. 3A, the electrodes of the capacitive sense array 125 form a single solid diamond (SSD) pattern. In some embodiments, each intersection between a row electrode and a column electrode defines a unit cell. Each point within the unit cell is closer to the associated intersection than to any other intersection. For example, the unit cell 320 contains the points that are closest to the intersection between the row electrode 304 and the column electrode 316.

In some embodiments, a capacitive touch sensing system collects data from the entire touch sensing surface of sense array 125 by performing a scan to measure capacitances of the unit cells in the touch sensing surface, then processes the touch data serially or in parallel with a subsequent scan. For example, a system that processes touch data serially may collect raw capacitance data from each unit cell of the entire touch sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition. In some embodiments, the capacitive touch sensing system performs mutual capacitance sensing of the touch sensing surface (e.g., the sense array 125) by individually sensing each intersection between a row electrode and a column electrode. Thus, the total number of sense operations for a capacitive sense array (e.g., the sense array 125) having X rows and Y columns is X×Y. In some embodiments, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

Additionally, although the row and column electrodes appear as bars, elongated rectangles or diamonds in FIGS. 3A and 3B, various tessellated shapes (e.g., rhomboids and chevrons) may also be used.

In some embodiments, referring to FIG. 3A, a stylus 130 is positioned in proximity to or in contact with a touch sensing surface of the capacitive sense array 125. The conductive tip 212 and wire module 214 transmit the tip drive signal 222 and wire drive signal 224, resulting in variations to an electric field of a subset of capacitive sense electrodes in the capacitive sense array 125. Stated another way, the conductive tip 212 operates as a first transmit electrode, and a first subset 322 of capacitive sense electrodes of the capacitive sense array 125 function as first RX electrodes. The conductive wire module 214 operates as a second transmit electrode, and a second subset 324 of capacitive sense electrodes of the capacitive sense array 125 function as second RX electrodes. In some embodiments, the capacitance sense circuit 101 scans the capacitive sense signals from the touch sensing device (e.g., using capacitive sense array 125). The capacitive sense signal obtained from the first capacitive sense electrodes 322 indicates positional information of the conductive tip 212 of the stylus 130, and the capacitive sense signal obtained from the second capacitive sense electrodes 324 indicates positional information of the conductive tip 212 of the stylus 130. Given that the conductive tip 212 and wire module 214 are substantially close to each other (e.g., both contained within the stylus 130), the first and second subsets 322 and 324 of capacitive sense electrodes overlap. An overlapping area of the first and second subsets 322 and 324 of capacitive sense electrodes is determined by at least the distance of the conductive tip 212 from the capacitive sense array 125, the tilt angle of the stylus 130, or both.

Referring to FIGS. 3A and 3B, in some embodiments, capacitive sensors of the capacitive sense array 125 are made from more than one electrode layers (e.g., a column electrode layer and a row electrode layer). In some embodiments not shown, capacitive sensors of the capacitive sense array 125 are made from a single electrode layer, and the single electrode layer is configured to provide a plurality of individual array element electrodes. Independently of whether the capacitive sense array 125 has one or multiple electrode layers, the capacitive sensors of the capacitive sense array 125 are coupled to a stylus 130 to detect one or more first orientation parameters of the stylus 130.

Figure 4:
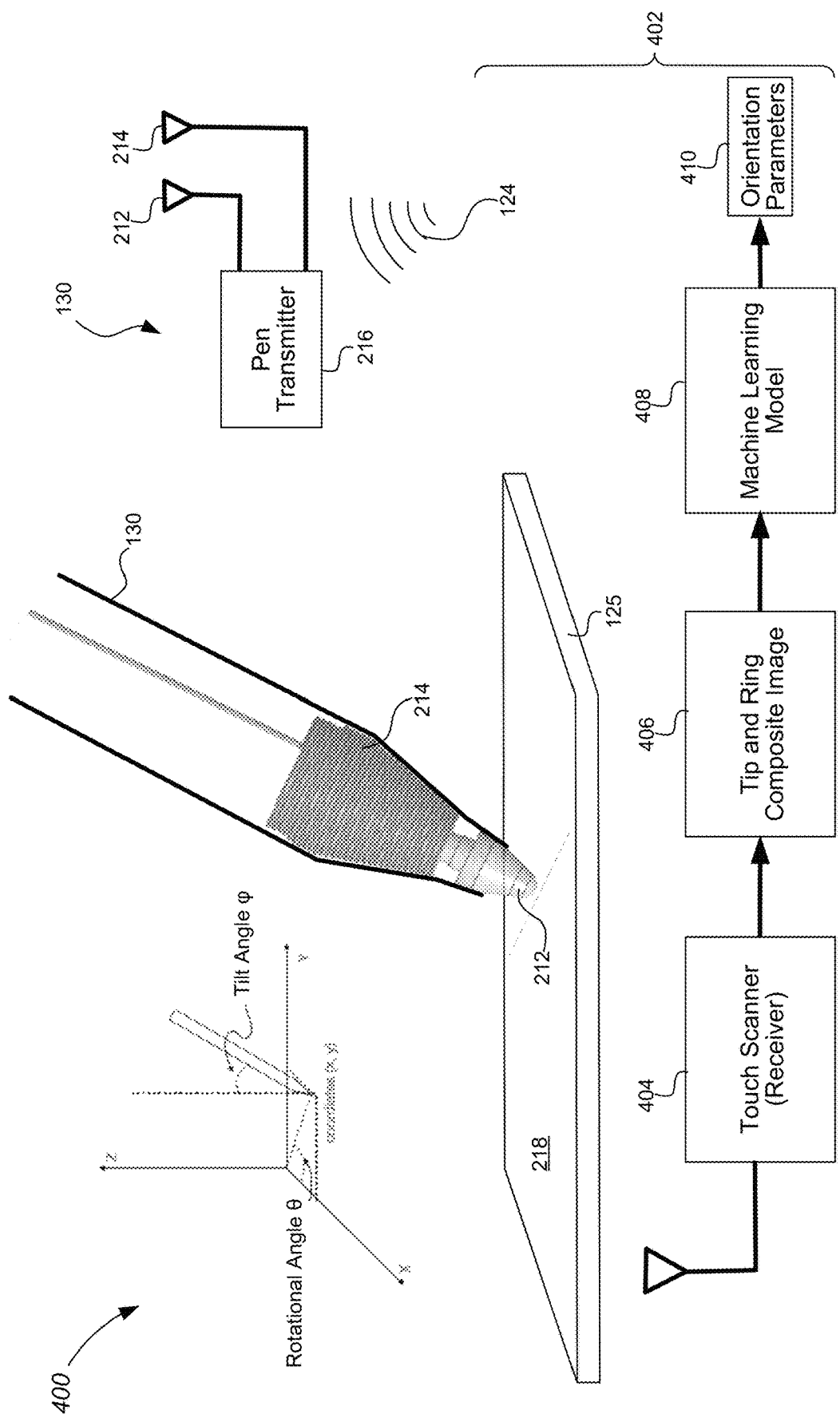
FIG. 4 is a block diagram of a stylus sensing subsystem of an electronic system, in accordance with some embodiments.

FIG. 4 is a block diagram of a stylus sensing subsystem 400 of an electronic system 100, in accordance with some embodiments. The stylus sensing subsystem 400 includes a stylus 130 and a panel portion 402. The panel portion 402 provides timing and communication parameters to the stylus 130 in an uplink transmission via the wireless communication link 124. The stylus 130 recovers transmission parameters (e.g., a transmission frequency and a number of pulse of a drive signal) from the timing and communication parameters. Specifically, the stylus 130 includes a conductive tip 212, a conductive wire module 214, and transmitter circuit 216. The transmitter circuit 216 is coupled to the conductive tip 212 and to the conductive wire module 214 and configured to generate a tip drive signal 222 and a wire drive signal 224 to drive the conductive tip 212 and the conductive wire module 214 based on the corresponding transmission parameters, respectively. The tip and wire drive signals 222 and 224 have the same stylus drive frequency, and are configured to drive the conductive tip 212 and wire module 214 simultaneously (e.g., in a synchronous manner).

The panel portion 402 includes a capacitive sense array 125 and a processing device 110 (see FIG. 1) that further includes a touch scanner circuit 404. In some embodiments, the touch scanner circuit 404 is implemented by at least the processing core 109 and the capacitance sense circuit 101 in the processing device 110 (see FIG. 1). While the conductive tip 212 and wire module 214 are driven simultaneously according to the tip and wire drive signals 222 and 224, the touch scanner circuit 404 scans the capacitive sense array 125 to obtain a plurality of capacitive sense signals from the plurality of capacitive sense electrodes of the capacitive sense array 125, and generates a first composite image 406 of the capacitive sense array 125 based on the plurality of capacitive sense signals. The first composite image 406 indicates an inseparable impact of the tip drive signal 222 and wire drive signal 224 on the capacitive sense array 125. In some embodiments, the first composite image 406 has an image resolution that is identical to the array resolution of the plurality of capacitive sense electrodes of the capacitive sense array 125. Each element of the first composite image 406 has a respective capacitive value that is determined based on a respective subset of the plurality of capacitive sense signals (e.g., measured from a single capacitive sense electrode or from a subset of related capacitive sense electrodes). Alternatively, in some embodiments, the first composite image 406 has an image resolution that is lower than an array resolution of the plurality of capacitive sense electrodes of the capacitive sense array 125. The touch scanner circuit 404 determines a peak of the plurality of capacitive sense signals that is measured by a peak electrode of the plurality of capacitive sense electrodes of the capacitive sense array 125, and identifies a subset of the plurality of capacitive sense electrodes including the peak electrode. The first composite image 406 corresponds to the subset of the plurality of capacitive sense electrodes (i.e., less than the entirety of the capacitive sense array 125).

In some embodiments, a machine learning model 408 is applied to process the first composite image 406 to determine one or more orientation parameters 410 of the stylus 130 with respect to a surface 218 of the capacitive sense array 125 (FIG. 2). In some embodiments, the machine learning model 408 includes a convolutional neural network (CNN), including a plurality of 2D convolutional layers and a fully-connected output layer. In some embodiments, the machine learning model 408 includes one or more of: a multi-stage support vector machine (SVM), a recursive neural network (RNN), a residual network (ResNet), and an encoder-decoder network (e.g., a U-net). In some situations, the ResNet and encoder-decoder are applied, but complicated and expensive to implement. As an alternative, an RNN or CNN based network is used instead of a ResNet for implementing the machine learning model 408. In some embodiments, the machine learning model 408 is trained by a server computer, and provided to the processing device 110 to process the first composite image 406. In some embodiments, the machine learning model 408 is stored in local memory of the electronic system 100 without encryption, and extracted from the local memory to process the first composite image 406. In some embodiments, the machine learning model 408 is encrypted and stored in local memory of the electronic system 100. The machine learning model 408 is extracted, and decrypted to process the first composite image 406. In some embodiments, the machine learning model 408 includes a number of layers, and the number is less than 10, such that the machine learning model 408 can be implemented efficiently in firmware. Such a machine learning model 408 typically does not include a CNN.

In some embodiments, the one or more orientation parameters 410 determined from the panel portion 402 includes one or both of: a tilt angle $\varphi$ measured with respect to the surface 218 of the capacitance sense array 125 and a rotational angle $\theta$ (also called Azimuth angle $\theta$) measured with respect to a reference axis (e.g., x-axis) on the surface 218 of the capacitance sense array 125.

In some embodiments, the processing device 110 determines whether the electronic system 100 operates in a second mode (i.e., a stylus touch mode) at the time of measuring the subset of capacitive sense signals (i.e., whether the subset of capacitive sense signals is measured concurrently while the tip and wire drive signals 222 and 224 are generated). In accordance with a determination that the subset of capacitive sense signals is measured concurrently with generation of the tip and wire drive signals 222 and 224, the corresponding event is caused by the stylus 130. Further, in some embodiments, the processing device 110 determines the position of the stylus 130 (specifically, a position of the conductive tip 212) on the surface 218 of the capacitive sense array 215 and/or whether the stylus 130 hovers above or physically touches the surface 218 of the capacitive sense array 125 based on the plurality of capacitive sense signals. For example, the plurality of capacitive sense signals is adjusted based on corresponding baseline values, and capacitive sense signals having the largest signal values are compared with one or more capacitive signal thresholds to determine whether a stylus touch or a stylus hover has occurred on the surface of the capacitive sense array 125.

In some embodiments, the stylus touch corresponds to a first capacitive signal threshold, and the stylus hover corresponds to a second capacitive signal threshold that is greater than a basic capacitive signal threshold and less than the first capacitive signal threshold. While the electronic system 100 operates in the second mode (i.e., the stylus touch mode), the stylus touch is detected in accordance with a determination that a subset of capacitive sense signals exceed the first capacitive signal threshold, and the stylus hover is detected in accordance with a determination that a subset of capacitive sense signals is with a range between the basic and first capacitive signal thresholds. No stylus touch or hover is detected in accordance with a determination that no capacitive sense signals exceed the basic capacitive signal threshold.

Alternatively, in some embodiments, the capacitive sense signals are mapped to the first composite image 406. The machine learning model 408 is applied to process the first composite image 406 to determine whether the stylus hovers above or physically touches the surface 218 of the capacitive sense array 125 in addition to the one or more orientation parameters 410. Additionally, in some embodiments, the machine learning model 408 determines the distance from the surface 218 of the capacitive sense array 125. In different embodiments, the machine learning model 408 is trained using test composite images in a supervised, semi-supervised, or unsupervised manner to determine the one or more orientation parameters 410 with respect to the surface 218, whether the stylus 130 hovers above or physically touches the surface 218, and/or the distance from the surface 218 of the capacitive sense array 125.

The first composite image 406 includes a single composite image extracted from the plurality of capacitive sense signals that are generated based on the tip drive signal 222 and wire drive signal 224 having the same frequency. The tip and wire drive signals 222 and 224 optionally have the same or different amplitude. Only the first composite image 406 needs to be processed by the machine learning model 408 to identify the orientation parameters 410. Unlike existing solutions, the stylus sensing subsystem 400 does not process the plurality of capacitive sense signals to generate separate signals of different frequencies, nor does the stylus sensing subsystem 400 need to use two time-multiplexed capacitive sense signals for the conductive tip 212 and wire module 214. By these means, the stylus sensing subsystem 400 is simplified for both temporal control and signal processing, while ensuring that orientation information of the stylus 130 can be accurately and promptly recovered using machine learning techniques (e.g., by the machine learning model 408).

Figure 5A:
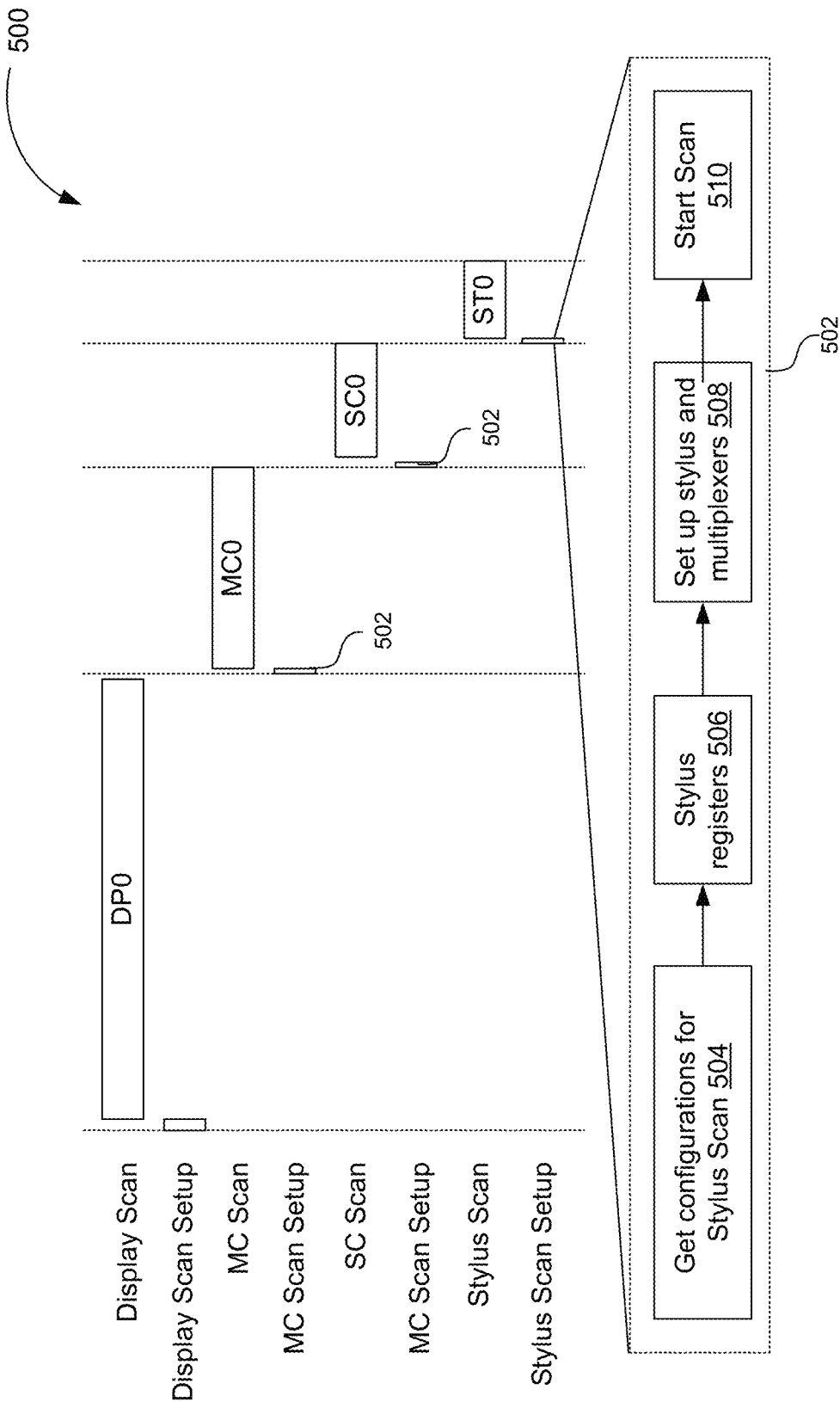
FIG. 5A is a flowchart of an example method for configuring a capacitive sense array to detect touch objects and a stylus, in accordance with some embodiments.

FIG. 5A is a flowchart of an example method 500 for configuring a capacitive sense array 125 to detect touch objects and a stylus 130, in accordance with some embodiments. A sequence of capacitive sense scans includes a mutual capacitance scan (e.g., MC0), a self capacitance scan (e.g., SC0), and a stylus scan (e.g., ST0). The mutual capacitance scan and self capacitance scan are applied to detect whether the touch objects touch, or hover above, a touch sensing surface 218 of the capacitive sense array 125 (FIG. 2). The stylus scan is applied to detect whether a stylus 130 touches, or hovers above, the touch sensing surface 218 of the capacitive sense array 125 (FIG. 2). Each of the mutual capacitance, self capacitance, and stylus scans is preceded with a scan preparation phase 502 during which the capacitance sense circuit 101 is configured to load corresponding scan configurations for the purposes of implementing the respective scan. The scan configuration associated with each mutual capacitance or stylus scan includes one or more multiplexer settings, transmission parameters (e.g., transmission frequency, and the number of transmission pulses), and baseline values. In some embodiments, the capacitance sense circuit 101 includes one or more channel registers that are configured to store the transmission parameters associated with each scan type. The transmission parameters are modified using inter-integrated circuit (I2C) commands, and thus scan configurations of the capacitance sense circuit 101 are tunable based on the transmission parameters stored in the channel registers.

Figure 7:
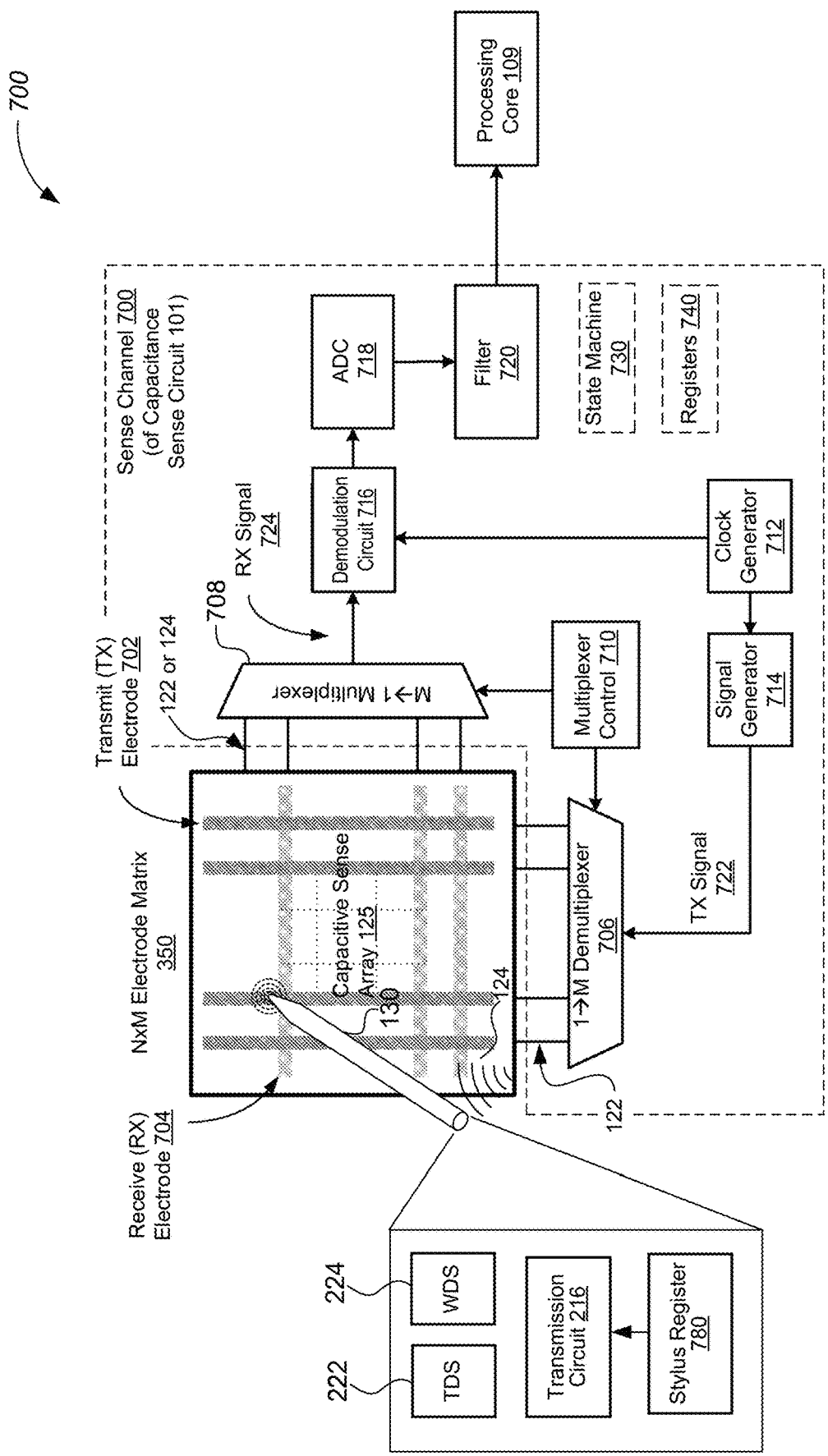
FIG. 7 is a schematic diagram of another example capacitance sense circuit that provides an integrated sense channel to measure capacitive sense signals during capacitive sense scans, in accordance with some embodiments.

For example, during a scan preparation phase 502 prior to the stylus scan (e.g., ST0), the capacitive sense array 125 determines that a subsequent scan includes a stylus scan and obtains (504) scan configuration data associated with the stylus scan ST0. Both stylus transmission parameters and multiplexer settings of the scan configurations are stored (506) for use in the subsequent stylus scan ST0 implemented by the stylus 130 and capacitive sense array 125. Specifically, the stylus transmission parameters are optionally stored in the channel register 740 (FIG. 7) of the capacitive sense array 125 and used to control the subsequent scan of the capacitive sense array 125. The stylus transmission parameters are also wirelessly transmitted to the stylus 130 via a wireless communication link 124, and temporarily stored (506) in a stylus register 780 (FIG. 780) of the stylus 130 to drive the stylus 130 in the subsequent stylus scan ST0. The multiplexer parameters are temporarily stored (506) in the channel registers 740 of the capacitive sense array 125 (FIG. 7). The stylus 130 sets up a stylus transmitter circuit 216 that drives a conductive tip 212 and a conductive wire module 214 according to the stylus transmission parameters, while the capacitive sense array 125 sets up (508) mutliplexer 708 and/or demultiplexer 706 of a sense channel 700 (FIG. 7) according to the mutliplexer settings of the scan configurations. As such, the sense channel 700 of the capacitive sense array 125 can start (510) the stylus scan ST0 based on the stylus transmission parameters and multiplexer settings of the scan configurations.

In some embodiments, the sequence of capacitive sense scans (MC0, SC0, and ST0) follows, or is followed by, a display scan (e.g., DP0). The electronic system 100 includes a touch display device having the plurality of capacitive sense electrodes and a plurality of display elements. During the display scan, a plurality of display drive signals are generated to drive the plurality of display elements. In some embodiments, the processing device 110 has a first duty cycle corresponding to the display scan (e.g., DP0) and a second duty cycle corresponding to, the sequence of capacitive sense scans (MC0, SC0, and ST0) in which the capacitive sense array 125 is scanned. Further, in some embodiments, the second duty cycle is less than a threshold portion (e.g., 60%) of the first duty cycle of the processing device. In some embodiments, the one or more orientation parameters 410 of the stylus are determined within a subset of the second duty cycle. Further, in some embodiments, the stylus scan ST0 in which the one or more orientation parameters 410 of the stylus are determined is shortened (e.g., from 50% to 10% of the first duty cycle), such that the first duty cycle or a display refresh rate for the display scan can be enhanced to improve display quality of the touch display.

Figure 5B:
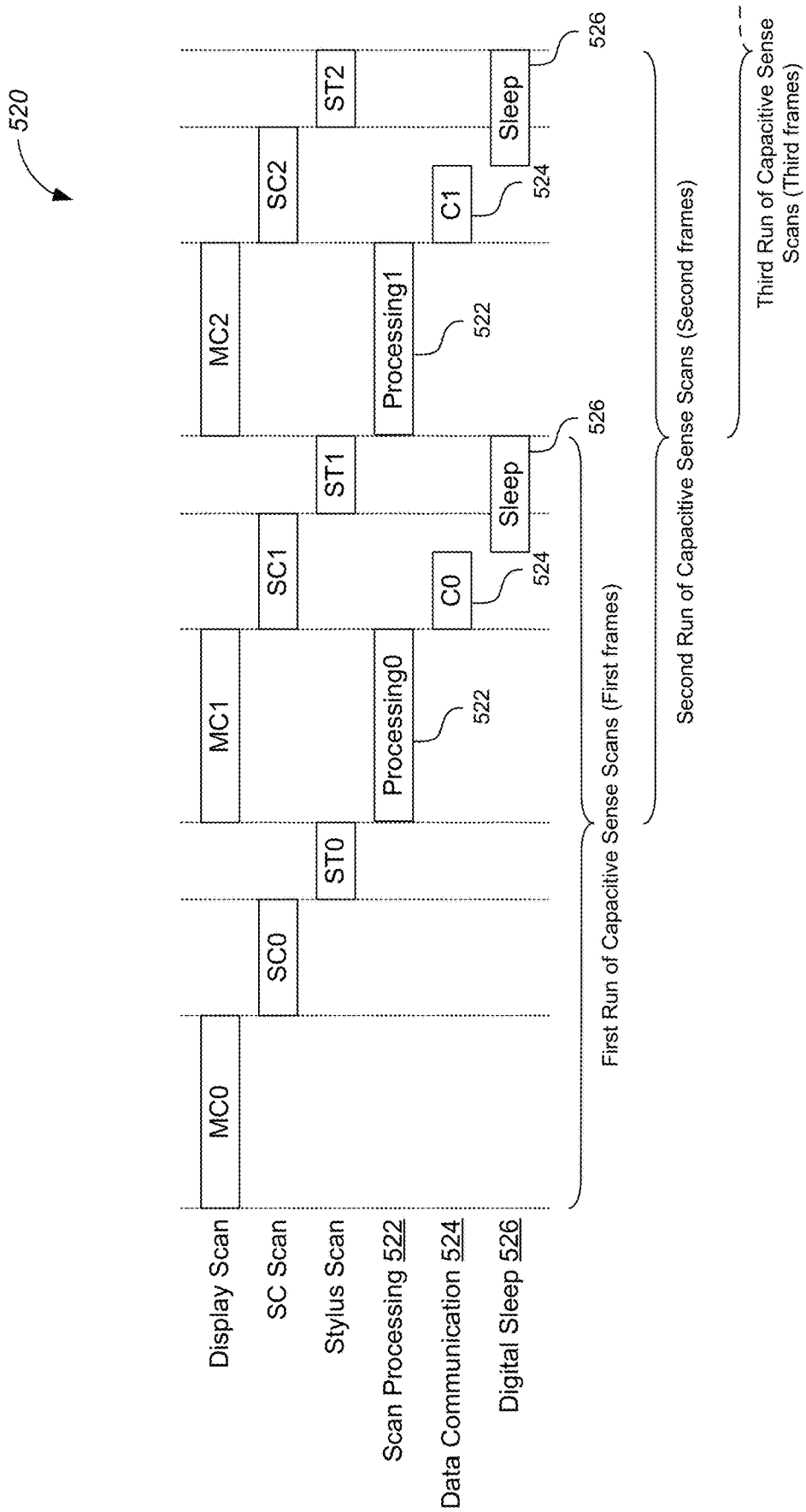
FIG. 5B is a timing diagram of a sequence of capacitive sense scans, scan processing, and data communication, in accordance with some embodiments.

FIG. 5B is a timing diagram 520 of a sequence of capacitive sense scans, scan processing 522, and data communication 524, in accordance with some embodiments. The illustrated sequence of capacitive sense scans includes three runs of capacitive sense scans. In some embodiments, the capacitive sense scans are conducted within a small time span and in sequence. Each run of capacitive sense scans further includes one or more of: a mutual capacitance (MC) scan, a self capacitance (SC) scan, and a stylus scan of the capacitive sense array 125. Referring to FIG. 5B, in some embodiments, the MC scan precedes the SC scan, and is implemented on the entire capacitive sense array 125. The SC scan is implemented on a subset of sense electrodes of the capacitive sense array 125 determined based on the preceding MC scan. In some embodiments not shown in FIG. 5B, the SC scan precedes the MC scan and is implemented on the entire capacitive sense array 125. The MC scan is implemented on a subset of sense electrodes of the capacitive sense array 125 determined based on the preceding SC scan. In some situations, after the SC scan, it is determined that the MC scan can be bypassed. In some embodiments, the stylus scan follows or precedes the MC and/or SC scans in each run of capacitive sense scans. In some embodiments not shown, each run of capacitive sense scans only includes the stylus scan.

The sequence of capacitive sense scans 520 are implemented by the capacitance sense circuit 101, and provide a plurality of capacitive sense signals and one or more stylus sense signals, respectively. In accordance with the capacitive sense signals, the capacitance sense circuit 101, the processing core 109, and the touch sense driver 102 are configured to, independently or collaboratively, determine the state of the capacitive sense array 125 (e.g., determining whether an object 140 or stylus 130 is detected on or in proximity to the touch sensing surface), resolve where the object 140 or stylus 130 is on the sense array (e.g., determining the location of the object 140 or stylus 130), track the motion of the object 140 or stylus 130, or generate other information related to an object 140 or stylus 130 detected at the touch sensing surface associated with the capacitive sense array 125. More specifically, during each run of capacitive sense scans, the respective capacitive sense scans are followed by touch determination processing of the capacitive sense signals to determine touch events on the touch sensing surface. In some embodiments, the touch determination process includes a scan processing phase 522, a data communication phase 524, and a digital sleep phase 526. The scan processing phase 522 results in a frame of touch and stylus sense data (e.g., a first composite image 406 in FIG. 4) obtained based on a corresponding capacitive sense scan. The frame of data is then communicated to the host device 150 (FIG. 1) during a subsequent data communication phase 524 before the respective run of capacitive sense scan is terminated at the digital sleep phase 506. In some embodiments, the capacitive sense scan is implemented as analog functions of the processing device 110, while the scan processing phase 522, the data communication phase 524 and the digital sleep phase 526 are controlled as digital functions of the processing device 110.

Each frame of touch data includes a set of touch data calculated based on capacitive sense signals that are measured from the respective capacitive sense scan (e.g., a stylus scan). In some embodiments, the touch sense data has an 8-bit resolution. A capacitive sense scan provides a set of touch data of an object. A stylus scan provides a set of touch data of the stylus 130, e.g., the first composite image 406 including touch information associated with touches of the stylus 130 detected during the stylus scan, and the touch information optionally includes position, orientation, and/or motion information of the stylus 130.

In some embodiments, a second run of capacitive sense scans (e.g., MC1/SC1/ST1) is preceded by a first run of capacitive sense scans (e.g., MC0/SC0/ST0) and followed by a third run of capacitive sense scans (e.g., MC2/SC2/ST2) without overlapping with each other. In some embodiments, each run of capacitive sense scans is followed by respective touch determination processing. Some embodiments use a signal processing pipeline to complete two consecutive touch event detection operations on the touch sensing surface in parallel. For example, when the capacitance sense circuit 101 completes a preceding run of capacitive sense scans (MC0/SC0/ST0) and directly moves to a current run of capacitive sense scans (MC1/SC1/ST1), touch determination processing operations (Processing0, C0, and Sleep) associated with the first run of capacitive sense scans (MC0/SC0/ST0) is executed simultaneously with the second run of capacitive sense scans (MC1/SC1/ST1) by at least the processing device 110. Likewise, when the capacitance sense circuit 101 completes the second run of capacitive sense scans (MC1/SC1/ST1) and directly moves to the third run of capacitive sense scans (MC2/SC2/ST2), digital touch determination processing (Processing1, C1 and Sleep) associated with the second run of capacitive sense scans (MC1/SC1/ST1) is executed simultaneously with the third run of capacitive sense scans n (MC2/SC2/ST2) by at least the processing device 110. Thus, consecutive touch detection operations are executed partially in parallel, thereby enabling a fast detection rate for accurate touch detection.

Figure 6:
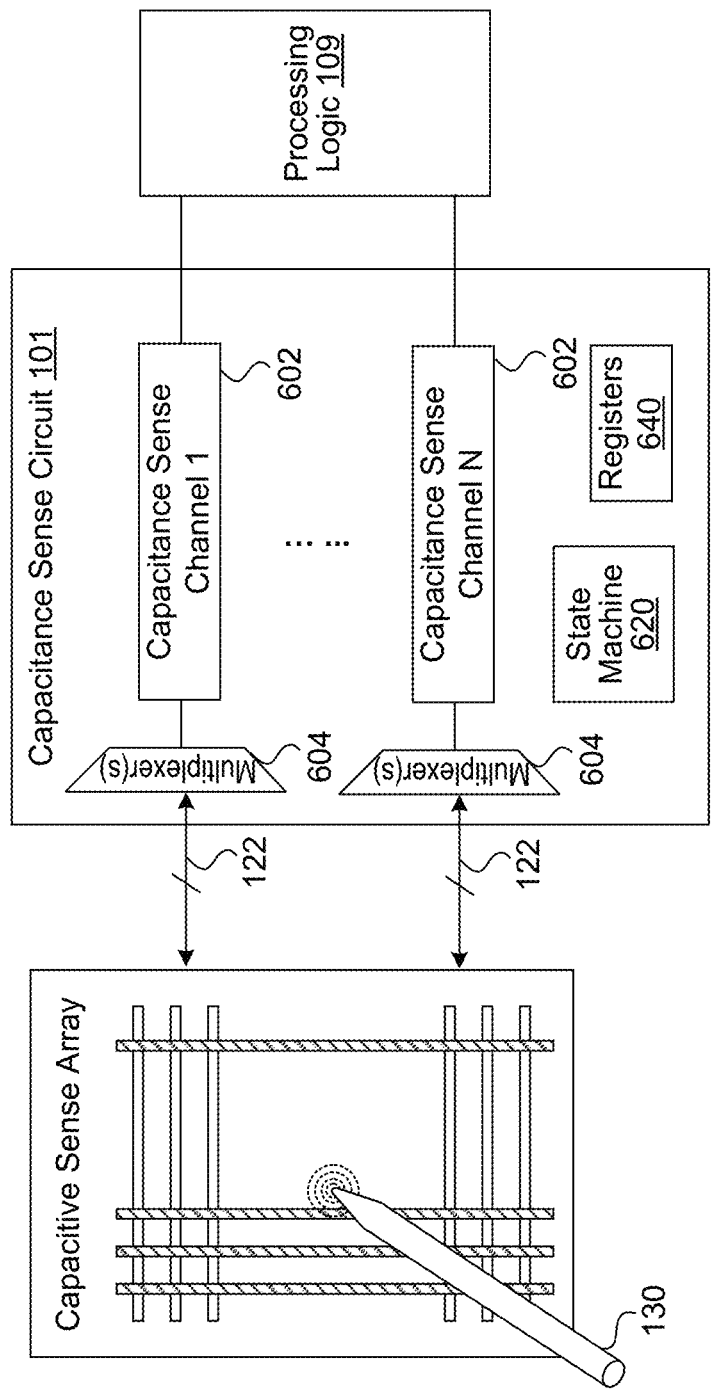
FIG. 6 is a schematic diagram of an example capacitance sense circuit that is configured to measure capacitive sense signals during capacitive sense scans, in accordance with some embodiments.

FIG. 6 is a schematic diagram of an example capacitance sense circuit 101 that is configured to measure capacitive sense signals during capacitive sense scans, in accordance with some embodiments. The capacitance sense circuit 101 includes one or more capacitive sense channels 602. In some embodiments, the channels are substantially identical. Each of the one or more capacitance sense channels 602 is coupled to the multiplexers 604, thereby enabling connection to capacitive sense electrodes of the capacitive sense array 125 by the bus 122. When the multiplexers 604 for a capacitance sense channel 602 select one or more of the sense electrodes of the capacitive sense array 125, the capacitance sense channel 602 is configured to measure the corresponding capacitive sense signal(s) for detecting candidate touches on the touch sensing surface.

In some embodiments, the capacitive sense circuit 101 includes a state machine 620 and registers 640. For example, the registers 640 include configuration information for the capacitive sense electrodes selected for the capacitive sense scans or stylus scans, a scan frequency, and pulse numbers of a transmission signal used for mutual capacitance or stylus scans. Referring to FIG. 6, the state machine 620 obtains information stored in the registers 640 to configure the capacitive sense channels 602 to measure capacitive sense signals provided during the capacitive sense scans or stylus scans. It is noted that the same capacitance sense channels 602 are applied to detect the capacitive sense signals from the same capacitive sense array 125 during both of the capacitive sense scans or stylus scans. Subsequent processing in the processing device 110 associates the capacitive sense signals of each scan with a touch event of an object or the stylus 130.

FIG. 7 is a schematic diagram of another example capacitance sense circuit 101 that provides an integrated sense channel 700 to measure capacitive sense signals during capacitive sense scans, in accordance with some embodiments. The sense channel 700 is configured to measure the capacitive sense signals associated with changes in measured capacitances during a capacitive sense scan (e.g., a MC scan, a SC scan, and a stylus scan). In some embodiments, the capacitive sense array 125 and capacitance sense circuit 101 are implemented in a system such as electronic system 100. During the capacitive sense scan, the capacitive sense signals are further processed to determine coordinates indicating the presence and location of touch. The coordinates are calculated based on changes in measured capacitances relative to the capacitances of the same touch capacitive sense array 125 in an un-touched state. In some embodiments, the capacitive sense array 125 includes a matrix 350 of N×M electrodes (N receive electrodes and M transmit electrodes), which includes transmit electrode 702 and receive electrode 704. Each of the electrodes in the matrix 350 is connected with the demultiplexer 706 or the multiplexer 708 of the capacitance sense circuit 101 by the bus 122. During a mutual capacitive scan, each of the electrodes in the matrix 350 is configured to receive a transmission signal from the capacitance sense circuit 101 by the bus 122, or provide a capacitive sense signal to the capacitance sense circuit 101 by the bus 122.

During a scan preparation phase 502 of a stylus scan, the sense channel 700 provides timing and communication parameters to the stylus 130 in an uplink transmission via a wireless communication link 124. The stylus 130 recovers stylus transmission parameters from the timing and communication parameters. In some embodiments, the stylus transmission parameters are temporarily stored in the stylus register 780. In an example, the stylus transmission parameters include one or more of: an amplitude, a delay, a transmission frequency, and a number of transmission pulses for a respective drive signal driving the conductive tip 212 or wire module 214 of the stylus 130. In accordance with the stylus transmission parameters, transmission circuit 216 of the stylus 130 generates a tip drive signal (TDS) 222 and a wire drive signal (WDS) 224 to drive the conductive tip 212 and the conductive wire module 214 of the stylus 130, respectively. While the transmitter circuit 216 is being set up according to the stylus transmission parameters, multiplexers 708 are set up according to the mutliplexer settings of scan configurations in the sense channel 700 of the capacitive sense circuit 101. The sense channel 700 of the capacitive sense array 125 starts the stylus scan in which both of the conductive tip 212 and wire module 214 of the stylus 130 transmit drive signals having the same frequency and the sense channel 700 captures a composite image 406 including positional information of both of the conductive tip 212 and wire module 214.

The sense channel 700 of the capacitance sense circuit 101 includes a multiplexer control 710, a demultiplexer 706, a multiplexer 708, a clock generator 712, a signal generator 714, a demodulation circuit 716, and an analog to digital converter (ADC) 718. The ADC 718 is further coupled with a filter 720. The filter 720 is optionally implemented in the processing core 109. The above circuit blocks 706-720 are applied for mutual capacitance scans. However, some of these circuit blocks (e.g., the demultiplexer 706, the clock generator 712, and the signal generator 714) are disabled for self capacitance scans because self capacitance scans do not need transmission signals to drive the capacitive sense array 125.

The transmit and receive electrodes in the electrode matrix 350 may be arranged so that each of the transmit electrodes overlaps and crosses each of the receive electrodes, forming an array of intersections, while maintaining galvanic isolation from each other. Thus, each transmit electrode may be capacitively coupled with each of the receive electrodes. For example, the transmit electrode 702 is capacitively coupled with the receive electrode 704 at the point where the transmit electrode 702 and the receive electrode 704 overlap.

The clock generator 712 supplies a clock signal to the signal generator 714, which produces a TX signal 722 to be supplied to the transmit electrodes of capacitive sense array 125. In some embodiments, the signal generator 714 includes a set of switches that operate according to the clock signal from clock generator 712. The switches may generate a TX signal 722 by periodically connecting the output of the signal generator 714 to a first voltage and then to a second voltage, where the first and second voltages are different.

The output of signal generator 714 is connected with a demultiplexer 706, which allows the TX signal 722 to be applied to any of the M transmit electrodes of the capacitive sense array 125. In some embodiments, the multiplexer control 710 controls demultiplexer 706 so that the TX signal 722 is applied to each transmit electrode 702 in a controlled sequence. The demultiplexer 706 may also be used to ground, float, or connect an alternate signal to the other transmit electrodes to which the TX signal 722 is not currently being applied. In some implementation, the TX signal 722 is presented in a true form to a subset of the transmit electrodes 702 and in a complement form to a second subset of the transmit electrodes 702, where there is no overlap in members of the first and second subsets of transmit electrodes 702.

Because of the capacitive coupling between the transmit and receive electrodes, the TX signal 722 applied to each transmit electrode induces a current within each of the receive electrodes. For instance, when the TX signal 722 is applied to transmit electrode 702 through demultiplexer 706, the TX signal 722 induces an RX signal 724 on the receive electrodes in matrix 350. The RX signal 724 on each of the receive electrodes can then be measured in sequence by using the multiplexer 708 to connect each of the N receive electrodes to demodulation circuit 716 in sequence.

The mutual capacitance associated with each intersection between a TX electrode and an RX electrode can be sensed by selecting every available combination of TX electrode and an RX electrode using the demultiplexer 706 and the multiplexer 708. To improve performance, the multiplexer 708 may also be segmented to allow more than one of the receive electrodes in the matrix 350 to be routed to additional demodulation circuits 716. In configurations with a 1-to-1 correspondence of instances of demodulation circuit 716 with receive electrodes, the multiplexer 708 may not be present in the system.

When an object, such as a finger, approaches the electrode matrix 350, the object causes a change in the measured mutual capacitance between only some of the electrodes. For example, if a finger is placed near the intersection of transmit electrode 702 and receive electrode 704, the presence of the finger will decrease the charge coupled between electrodes 702 and 704. Thus, the location of the finger on the touchpad can be determined by identifying the one or more receive electrodes having a decrease in measured mutual capacitance in addition to identifying the transmit electrode to which the TX signal 722 was applied at the time the decrease in capacitance was measured on the one or more receive electrodes.

By determining the mutual capacitances associated with each intersection of electrodes in the matrix 350, the presence and locations of one or more conductive objects may be determined. The determination may be sequential, in parallel, or may occur more frequently at commonly used electrodes.

In some embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced RX signal 724 is integrated by the demodulation circuit 716. The rectified current output by demodulation circuit 716 can then be converted to a digital code by the ADC 718, and filtered by a filter 720 based on a baseline associated with the corresponding TX and RX electrodes. In some embodiments, the baseline associated with each combination of TX and RX electrodes is adjusted individually according to a surface condition at a corresponding location of the touch sensing surface (e.g., whether the corresponding location is covered by a water drop).

A series of such filtered digital codes measured from adjacent sensors or intersections is further converted to touch coordinates indicating a position of an input on touch capacitive sense array 125 by a touch coordinate converter (not shown) optionally disposed in the capacitance sense circuit 101, the touch sense driver 102, or the processing core 109. The touch coordinates may then be used to detect gestures or perform other functions by the processing core 109.

In some embodiments, the capacitance sense circuit 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

In some embodiments, the sense channel 700 includes a state machine 730 and registers 740. The registers 740 store information for capacitive sense electrodes selected for capacitive sense scans or stylus scans, a scan frequency, and pulse numbers of a transmission signal used for mutual capacitance scans or stylus scans. The state machine 730 obtains information stored in the registers 740 to configure the demultiplexer 706, the multiplexer 708, the clock generator 712, the signal generator 714 or 734, and the demodulation circuit 716 to measure capacitive sense signals provided by the capacitive sense array 125 during a corresponding capacitive sense scan or a stylus scan.

Figure 8A:
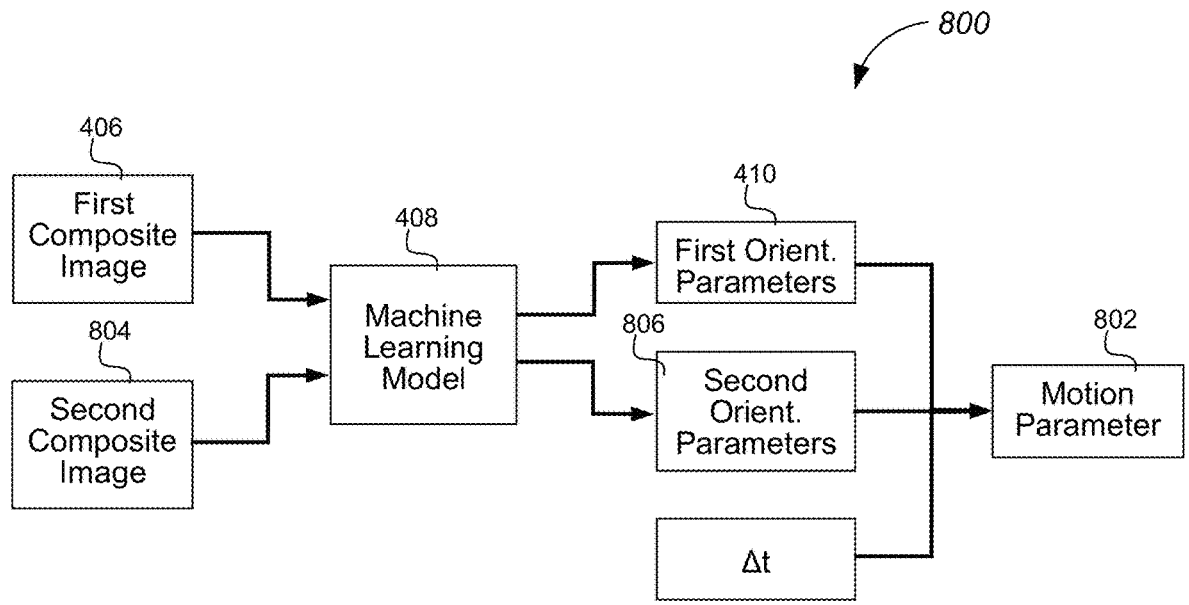
FIG. 8A is a flow diagram of an example process for determining motion parameters of a stylus, in accordance with some embodiments.

FIG. 8A is a flow diagram of an example process 800 for determining motion parameters 802 of a stylus 130, in accordance with some embodiments. The plurality of capacitive sense signals include a plurality of first capacitive sense signals that are captured at a first time $T_1$ and a plurality of second capacitive sense signals that are captured at a second time $T_2$ subsequent to the first time $T_1$. A time difference between the first and second times $T_1$ and $T_2$ is $\Delta t$. A first composite image 406 is generated based on the plurality of first capacitive sense signal. A second composite image 804 of the capacitive sense array 125 is generated based on the plurality of second capacitive sense signals. The machine learning model 408 is applied to process the first and second composite images 406 and 804 sequentially to determine one or more first orientation parameters 410 and one or more second orientation parameters 806 of the stylus 130 with respect to the surface 218 of the capacitive sense array 125. A motion parameter 802 of the stylus 130 is determined based on the first and second orientation parameters 410 and 806 of the stylus 130. Examples of the motion parameters 802 include, but not limited to, a translational motion rate, a rotation rate, and a tilting change rate.

Figure 8B:
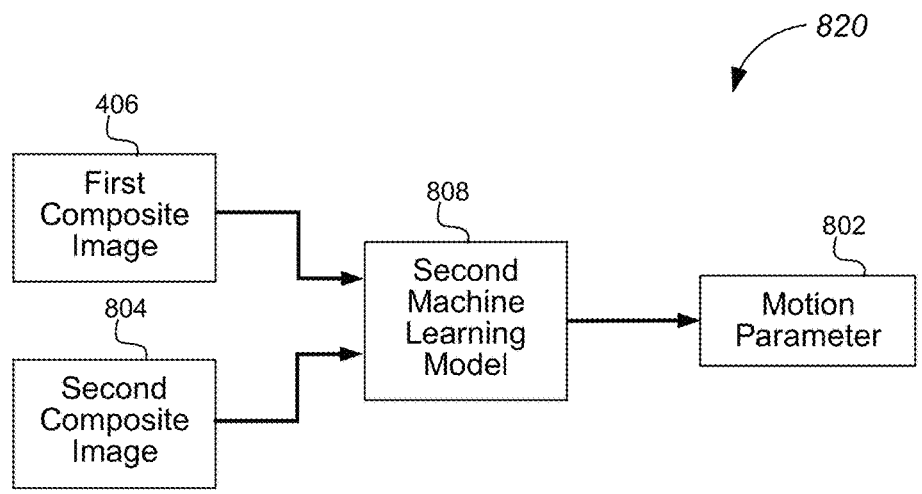
FIG. 8B is a flow diagram of another example process for determining motion parameters of a stylus, in accordance with some embodiments.

FIG. 8B is a flow diagram of another example process 820 for determining motion parameters 802 of a stylus 130, in accordance with some embodiments. A first machine learning model 408 is configured to determine at least the one or more first orientation parameters 410 (FIG. 4). A second machine learning model 808 is distinct from the first machine learning model 408. The plurality of capacitive sense signals include a plurality of first capacitive sense signals that are captured at a first time $T_1$ and a plurality of second capacitive sense signals that are captured at a second time $T_2$ subsequent to the first time $T_1$. The first composite image 406 (FIG. 4) is generated based on the plurality of first capacitive sense signal. A second composite image 804 of the capacitive sense array 125 is generated based on the plurality of second capacitive sense signals. The second machine learning model 808 is applied to process the first and second composite images 406 and 804 to determine a motion parameter 802 of the stylus 130. Examples of the motion parameters 802 include, but not limited to, a translational motion rate, a rotation rate, and a tilting change rate. As such, the first machine learning model 408 and the second machine learning model 808 are applied to determine one or more orientation parameters 410 and motion parameters 802, respectively.

FIG. 9 is a flowchart for a method 900 of monitoring stylus touch events, in accordance with some embodiments. In some embodiments, the method 900 is performed by an electronic system 100 (FIG. 1A) or one or more components thereof, such as a processing device 110 including a capacitance sense circuit 101 and/or a processing core 109. In some embodiments, the method is performed by a touch detection device or a component thereof. In some embodiments, the operations of the method 900 described herein are interchangeable, and respective operations of the method 900 are performed by any of the aforementioned devices, systems, or combination of devices and/or systems. In some embodiments, the method 900 is governed by instructions that are stored in a non-transitory computer-readable storage medium, and are executed by one or more processors of a device/computing system, such as a processing device 110 of the electronic system 100. For convenience, the method 900 will be described below as being performed by a touch detection device.

The processing device 110 is coupled (902) to a capacitive sense array 125 and a stylus 130. The capacitive sense array 125 includes a plurality of sense electrodes. The stylus 130 includes a conductive tip 212 and a conductive wire module 214 (e.g., a single-turn circular ring or a spiral shaped structure having a plurality of turns). The conductive wire module 214 includes one turn or a plurality of turns of conductive wires. A cross section of the conductive wire module 214 is not limited to a circular shape, and can be any of a square, a rectangle, a triangle, a pentagon, a hexagon, and other irregular or regular shapes. The processing device 110 causes (904) a tip drive signal 222 to drive the conductive tip 212 and a wire drive signal 224 to drive the conductive wire module 214 simultaneously. The tip and wire drive signals 222 and 224 (906) have a single stylus drive frequency. While the conductive tip and wire module 212 and 214 are driven simultaneously according to the tip and wire drive signals 222 and 224, the processing device 110 scans (908) the capacitive sense array 125 to obtain a plurality of capacitive sense signals from the plurality of sense electrodes of the capacitive sense array 125. The processing device 110 generates (910) a first composite image 406 of the capacitive sense array 125 based on the plurality of capacitive sense signals and applies (912) a machine learning model 408 to process the first composite image 406 to determine one or more first orientation parameters 410 of the stylus 130 with respect to a surface 218 of the capacitive sense array 125.

In some embodiments, the processing device 110 determines a position of the conductive tip 212 of the stylus 130 on the surface 218 of the capacitive sense array 125 based on the plurality of capacitive sense signals. In some embodiments, the processing device 110 applies the machine learning model to process to first composite image 406 to determine a position of the conductive tip 212 of the stylus 130 on the surface 218 of the capacitive sense array 125 jointly with the one or more first orientation parameters 410 of the stylus 130. In some embodiments, the processing device 110 determines a position of the stylus 130 on the surface 218 of the capacitive sense array 125 and/or whether the stylus 130 hovers above or physically touches the surface 218 of the capacitive sense array 125 based on the plurality of capacitive sense signals. Further, in some embodiments, the determination is made based on the plurality of capacitive sense signals directly. Alternatively, in some embodiments, the machine learning model 408 is applied to make the determination based on the first composite image 406. For example, the processing device 110 applies the machine learning model 408 to process the first composite image 406 to determine whether the stylus 130 hovers above or physically touches the surface 218 of the capacitive sense array 125, e.g., including a distance of the conductive tip 212 of the stylus 130 from the surface 218.

In some embodiments, the one or more first orientation parameters 410 includes (914) one or both of: a tilting angle φ (also referred to as the "tilt angle") measured with respect to the surface 218 of the capacitance sense array and a rotational angle θ measured with respect to a reference axis on the surface 218 of the capacitance sense array.

In some embodiments, the machine learning model 408 included a convolutional neural network (CNN), and is provided to the processing device 110. An example of a CNN includes a plurality of 2D convolutional layers and a final fully-connected layer coupled to the convolutional layers. Alternatively, in some embodiments, the machine learning model 408 is based on one of a residual neural network (ResNet), an encoder-decoder network, a transformer network, a neural radiance field, a multi-stage support vector machine (SVM), and a recursive neural network (RNN). In some embodiments, the machine learning model 408 is stored in memory of the processing device in an encrypted format. In some embodiments, the machine learning model 408 is trained in a server and provided to the processing device 1008 in an encrypted format.

In some embodiments, the first composite image 406 has an image resolution that is identical to an array resolution of the plurality of capacitive sense electrodes, and each element of the first composite image 406 has a respective capacitive value that is determined based on a respective subset of the plurality of capacitive sense signals. In some embodiments, the first composite image 406 has an image resolution that is lower than an array resolution of the plurality of capacitive sense electrodes. The processing device 110 determines a peak of the plurality of capacitive sense signals that is measured by a peak electrode of the plurality of capacitive sense electrodes, and identifies subset of the plurality of capacitive sense electrodes including the peak electrode. The first composite image 406 corresponds to the subset of the plurality of capacitive sense electrodes.

In some embodiments, the machine learning model 408 includes a first machine learning model. The plurality of capacitive sense signals include a plurality of first capacitive sense signals that are captured at a first time and a plurality of second capacitive sense signals that are captured at a second time subsequent to the first time. The first composite image 406 is generated based on the plurality of first capacitive sense signal. The processing device 110 generates a second composite image 804 of the capacitive sense array 125 based on the plurality of second capacitive sense signals and applies a second machine learning model 808 to process the first and second composite image 804 to determine a motion parameter 802 of the stylus 130.

In some embodiments, the plurality of capacitive sense signals include a plurality of first capacitive sense signals that are captured at a first time and a plurality of second capacitive sense signals that are captured at a second time subsequent to the first time. The first composite image 406 is generated based on the plurality of first capacitive sense signal. The processing device 110 generates a second composite image 804 of the capacitive sense array 125 based on the plurality of second capacitive sense signals, and applies the machine learning model 408 to process the second composite image 804 to determine one or more second orientation parameters 806 of the stylus 130 with respect to the surface 218 of the capacitive sense array 125. The processing device 110 determines a motion parameter 802 of the stylus 130 based on the first and second orientation parameters 410 and 806 of the stylus 130.

In some embodiments, the conductive tip 212 and conductive wire module 214 of the stylus 130 are electrically coupled (916) to each other, and the stylus 130 further includes a transmitter coupled to the conductive tip 212 and conductive wire module 214 of the stylus 130, and wherein the tip drive signal 222 and wire drive signal 224 are generated by the transmitter. Further, in some embodiments, the conductive tip 212 and conductive wire module 214 of the stylus 130 are coupled in series with each other, and each of the tip drive signal 222 and wire drive signal 224 includes a bias current provided by the transmitter. Alternatively and additionally, in some embodiments, the conductive tip 212 and conductive wire module 214 of the stylus 130 are coupled in parallel with each other, and each of the tip drive signal 222 and wire drive signal 224 includes a bias voltage provided by the transmitter.

In some embodiments, referring to FIG. 5A the processing device 110 has a first duty cycle (e.g., DP0) and a second duty cycle (e.g., MC0, SC0, ST0, or a combination thereof). During the first duty cycle (e.g., DP0), a plurality of display drive signals are generated to drive a plurality of display elements of a display panel integrated with the capacitive sense array 125 125. The capacitive sense array 125 is scanned during the second duty cycle. Further, in some embodiments, the second duty cycle is less than a threshold portion (e.g., 60%) of the first duty cycle of the processing device. In some embodiments, the one or more first orientation parameters 410 of the stylus 130 are determined in a subset of the second duty cycle, e.g., ST0.

In some embodiments, referring to FIGS. 5A and 5B, the capacitive sense array 125 is scanned while the conductive tip and wire module 212 and 214 are driven by the tip and wire drive signals 222 and 224 during a third duty cycle (e.g., each of ST0, ST1, and ST2), and the processing device has a fourth duty cycle (e.g., each of MC0-MC2 and SC0-SC2) distinct from the third duty cycle. During the fourth duty cycle (e.g., MC0-MC2 and SC0-SC2), the processing device 110 scans the capacitive sense array 125 to obtain the plurality of capacitive sense signals from the plurality of sense electrodes of the capacitive sense array 125 while the stylus 130 is not driven by the tip and wire drive signals 222 and 224. Further, in some embodiments, during the fourth duty cycle (e.g., SC0-SC2), the plurality of capacitive sense signals correspond to self capacitance of the plurality of sense electrodes of the capacitive sense array 125. Alternatively, in some embodiments, during the fourth duty cycle (e.g., MC0-MC2), the plurality of capacitive sense signals correspond to mutual capacitance of the plurality of sense electrodes of the capacitive sense array 125. During the fourth duty cycle (e.g., MC0-MC2), the processing device 110 generates a stimulation signal to drive at least one transmission electrode of the plurality of capacitive sense electrodes while scanning the capacitive sense array 125.

In some embodiments, referring to FIGS. 5A and 5B, immediately before or after each scan of capacitive sense array 125 with the stylus 130 being actively driven, the processing device 110 scans the capacitive sense array 125 to monitor self-capacitance and mutual capacitance of the plurality of sense electrodes of the capacitive sense array 125 while the stylus 130 is not driven by the tip and wire drive signals 222 and 224.

It should be understood that the particular order in which the operations in FIG. 9 have been described is merely exemplary and are not intended to indicate that the described order is the only order in which the operations could be performed. One of ordinary skill in the art would recognize various ways to reorder the operations described herein. Additionally, it should be noted that details of a process described herein with respect to FIG. 9 are also applicable in an analogous manner to any other systems, devices, or methods described in FIGS. 1-8. For brevity, these details are not repeated in the description for different figures.

It will be understood that, although the terms first, second, etc. are, in some instances, used herein to describe various elements, these elements should not be limited by these terms. These terms are only used to distinguish one element from another. For example, a first voltage could be termed a second voltage, and, similarly, a second voltage could be termed a first voltage, without departing from the scope of the various described embodiments. The first voltage and the second voltage are both voltage levels, but they are not the same voltage level.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of monitoring stylus touch events, comprising:

at a processing device coupled to a capacitive sense array and a stylus, the capacitive sense array including a plurality of sense electrodes, the stylus including a conductive tip and a conductive wire module:

causing a tip drive signal to drive the conductive tip and a wire drive signal to drive the conductive wire module simultaneously, both the tip drive signal and the wire drive signal having a single stylus drive frequency;

while the conductive tip and the conductive wire module are driven simultaneously according to the tip drive signal and the wire drive signal, scanning the capacitive sense array to obtain a plurality of capacitive sense signals from the plurality of sense electrodes of the capacitive sense array;

generating a first composite image of the capacitive sense array based on the plurality of capacitive sense signals; and applying a machine learning model to process the first composite image to determine one or more first orientation parameters of the stylus with respect to a surface of the capacitive sense array.

2. The method of claim 1, wherein the one or more first orientation parameters include one or both of: a tilt angle φ measured with respect to the surface of the capacitance sense array and a rotational angle θ measured with respect to a reference axis on the surface of the capacitance sense array.

3. The method of claim 1, wherein the first composite image has an image resolution that is identical to an array resolution of the plurality of capacitive sense electrodes, and each element of the first composite image has a respective capacitive value that is determined based on a respective subset of the plurality of capacitive sense signals.

4. The method of claim 1, wherein the first composite image has an image resolution that is lower than an array resolution of the plurality of capacitive sense electrodes, and the method further comprises:
   determining a peak of the plurality of capacitive sense signals as measured by a peak electrode of the plurality of capacitive sense electrodes; and
   identifying a subset of the plurality of capacitive sense electrodes, including the peak electrode, wherein the first composite image corresponds to the subset of the plurality of capacitive sense electrodes.

5. The method of claim 1, further comprising:
   determining a position of the stylus on the surface of the capacitive sense array and/or determining whether the stylus hovers above or physically touches the surface of the capacitive sense array based on the plurality of capacitive sense signals.

6. The method of claim 1, further comprising:
   applying the machine learning model to process the first composite image to determine whether the stylus hovers above or physically touches the surface of the capacitive sense array.

7. The method of claim 1, wherein:
   (i) the machine learning model includes a first machine learning model;
   (ii) the plurality of capacitive sense signals includes a first plurality of capacitive sense signals that are captured at a first time and a second plurality of capacitive sense signals that are captured at a second time subsequent to the first time;
   (iii) the first composite image is generated based on the first plurality of capacitive sense signals; and
   (iv) the method further comprises:
      generating a second composite image of the capacitive sense array based on the second plurality of capacitive sense signals; and
      applying a second machine learning model to process the first composite image and the second composite image to determine a motion parameter of the stylus.

8. The method of claim 1, wherein:
   (i) the plurality of capacitive sense signals includes a first plurality of capacitive sense signals that are captured at a first time and a second plurality of capacitive sense signals that are captured at a second time subsequent to the first time;
   (ii) the first composite image is generated based on the first plurality of capacitive sense signals; and
   (iii) the method further comprises:
      generating a second composite image of the capacitive sense array based on the second plurality of capacitive sense signals;
      applying the machine learning model to process the second composite image to determine one or more second orientation parameters of the stylus with respect to the surface of the capacitive sense array; and
      determining a motion parameter of the stylus based on the first orientation parameters and the one or more second orientation parameters.

9. The method of claim 1, wherein:
   (i) the conductive tip and the conductive wire module are electrically coupled to each other;
   (ii) the stylus further includes a transmitter coupled to the conductive tip and coupled to the conductive wire module; and
   (iii) the tip drive signal and the wire drive signal are generated by the transmitter.

10. The method of claim 9, wherein the conductive tip and the conductive wire module are coupled in series with each other, and each of the tip drive signal and the wire drive signal includes a bias current provided by the transmitter.

11. The method of claim 9, wherein the conductive tip and the conductive wire module are coupled in parallel with each other, and each of the tip drive signal and the wire drive signal includes a bias voltage provided by the transmitter.

12. The method of claim 1, wherein the processing device has a first duty cycle and a second duty cycle, and the method further comprises:
   during the first duty cycle, generating a plurality of display drive signals to drive a plurality of display elements of a display panel integrated with the capacitive sense array;
   wherein the capacitive sense array is scanned during the second duty cycle.

13. The method of claim 12, wherein the second duty cycle is less than a threshold portion of the first duty cycle of the processing device.

14. The method of claim 12, wherein the one or more first orientation parameters of the stylus are determined during a portion of the second duty cycle.

15. The method of claim 1, wherein:
   (i) the capacitive sense array is scanned while the conductive tip and the conductive wire module are driven by the tip drive signal and the wire drive signal during a third duty cycle;
   (ii) the processing device has a fourth duty cycle distinct from the third duty cycle; and
   (iii) the method further comprises:
      during the fourth duty cycle, scanning the capacitive sense array to obtain the plurality of capacitive sense signals from the plurality of sense electrodes of the capacitive sense array while the stylus is not driven by the tip drive signal and the wire drive signal.

16. The method of claim 15, wherein, during the fourth duty cycle, the plurality of capacitive sense signals correspond to self capacitance of the plurality of sense electrodes of the capacitive sense array.

17. The method of claim 15, wherein, during the fourth duty cycle, the plurality of capacitive sense signals correspond to mutual capacitance of the plurality of sense electrodes of the capacitive sense array, the method further comprising:
   during the fourth duty cycle, generating a stimulation signal to drive at least one transmission electrode of the plurality of capacitive sense electrodes while scanning the capacitive sense array.

18. The method of claim 1, further comprising:
   immediately before or after each scan of the capacitive sense array with the stylus being actively driven, scanning the capacitive sense array to monitor self-capacitance and mutual capacitance of the plurality of sense electrodes of the capacitive sense array while the stylus is not driven by the tip drive signal and the wire drive signal.

19. A processing device, comprising:
a processing core, wherein the processing device is coupled to a capacitive sense array and a stylus, the capacitive sense array including a plurality of sense electrodes, the stylus including a conductive tip and a conductive wire module; and
memory storing one or more programs configured for execution by the processing core, the one or more programs comprising instructions for:
    causing a tip drive signal to drive the conductive tip and a wire drive signal to drive the conductive wire module simultaneously, both the tip drive signal and the wire drive signal having a single stylus drive frequency;
    while the conductive tip and the conductive wire module are driven simultaneously according to the tip drive signal and the wire drive signal, scanning the capacitive sense array to obtain a plurality of capacitive sense signals from the plurality of sense electrodes of the capacitive sense array;
    generating a first composite image of the capacitive sense array based on the plurality of capacitive sense signals; and
    applying a machine learning model to process the first composite image to determine one or more first orientation parameters of the stylus with respect to a surface of the capacitive sense array.

20. An electronic device, comprising:
a capacitive sense array including a plurality of sense electrodes;
a stylus including a conductive tip and a conductive wire module;
a processing device coupled to the capacitive sense array and the stylus, wherein the processing device is configured to perform:
    causing a tip drive signal to drive the conductive tip and a wire drive signal to drive the conductive wire module simultaneously, both the tip drive signal and the wire drive signal having a single stylus drive frequency;
    while the conductive tip and the conductive wire module are driven simultaneously according to the tip drive signal and the wire drive signal, scanning the capacitive sense array to obtain a plurality of capacitive sense signals from the plurality of sense electrodes of the capacitive sense array;
    generating a first composite image of the capacitive sense array based on the plurality of capacitive sense signals; and
    applying a machine learning model to process the first composite image to determine one or more first orientation parameters of the stylus with respect to a surface of the capacitive sense array.

* * * * *